(12) United States Patent
Tadayon et al.

(10) Patent No.: US 11,815,405 B2
(45) Date of Patent: Nov. 14, 2023

(54) PHOTONIC DEVICE USING RESONATOR DIFFERENCING TECHNIQUE

(71) Applicant: Fluke Corporation, Everett, WA (US)

(72) Inventors: Mohammad Amin Tadayon, Gaithersburg, MD (US); Kevin R. Williamson, Belgrade, MT (US)

(73) Assignee: Fluke Corporation, Everett, WA (US)

( * ) Notice: Subject to any disclaimer, the term of this patent is extended or adjusted under 35 U.S.C. 154(b) by 242 days.

(21) Appl. No.: 17/338,313

(22) Filed: Jun. 3, 2021

(65) Prior Publication Data

US 2021/0381906 A1 Dec. 9, 2021

Related U.S. Application Data

(60) Provisional application No. 63/034,056, filed on Jun. 3, 2020.

(51) Int. Cl.
*G01K 11/32* (2021.01)
*G01D 5/353* (2006.01)
(Continued)

(52) U.S. Cl.
CPC ......... *G01K 11/32* (2013.01); *G01D 5/35335* (2013.01); *G01J 5/0818* (2013.01);
(Continued)

(58) Field of Classification Search
CPC .... G01K 11/32; G01K 11/00; G01D 5/35335; G01J 5/0818; G01J 5/60; G02B 2006/12138
See application file for complete search history.

(56) References Cited

U.S. PATENT DOCUMENTS

| 4,515,430 A | 5/1985 | Johnson |
| 4,714,342 A | 12/1987 | Jackson et al. |

(Continued)

FOREIGN PATENT DOCUMENTS

| CN | 101825480 A | 9/2010 |
| WO | 84/04385 A1 | 11/1984 |
| WO | 2021/156731 A1 | 8/2021 |

OTHER PUBLICATIONS

International Search Report and Written Opinion for Application No. PCT/US2021/035757, dated Sep. 30, 2021, 16 pgs.

(Continued)

*Primary Examiner* — Dominic J Bologna
(74) *Attorney, Agent, or Firm* — SEED INTELLECTUAL PROPERTY LAW GROUP LLP

(57) ABSTRACT

A photonic device has a substrate with one or more optical resonators having a first resonant frequency response relative to temperature and a different second resonant frequency response relative to temperature. A first waveguide optically couples a first light beam having a first frequency to a first optical resonator and a second waveguide optically couples a second light beam having a second frequency to a second optical resonator. An optical shifter may shift an optical characteristic of the second light beam. A detector converts output light from the photonic device into an electric signal having a characteristic indicative of a physical condition, such as temperature, of the photonic device. In some cases, output light from the one or more optical resonators is combined and a temperature of the photonic device is determined from a beat frequency in the combined light. One or more multimode optical resonators may be used.

18 Claims, 14 Drawing Sheets

(51) Int. Cl.
*G01J 5/0818* (2022.01)
*G01J 5/60* (2006.01)
*G02B 6/12* (2006.01)
*G01K 11/00* (2006.01)

(52) U.S. Cl.
CPC ............... *G01J 5/60* (2013.01); *G01K 11/00* (2013.01); *G02B 2006/12138* (2013.01)

(56) References Cited

U.S. PATENT DOCUMENTS

| | | | |
|---|---|---|---|
| 4,974,961 A | 12/1990 | Jackson et al. | |
| 5,317,524 A * | 5/1994 | Das | G01D 5/268 250/227.21 |
| 6,243,506 B1 * | 6/2001 | Wu | G01K 11/00 385/12 |
| 7,796,262 B1 * | 9/2010 | Wang | G01N 33/54393 356/441 |
| 9,726,553 B2 | 8/2017 | Ahmed et al. | |
| 10,056,733 B1 | 8/2018 | Taylor et al. | |
| 10,900,838 B1 | 1/2021 | Podmore et al. | |
| 10,955,617 B2 | 3/2021 | Klimov et al. | |
| 2003/0118075 A1 | 6/2003 | Schweiger et al. | |
| 2005/0213869 A1 * | 9/2005 | Brown | G01D 5/35364 374/E11.015 |
| 2013/0194578 A1 | 8/2013 | Niskanen et al. | |
| 2016/0047677 A1 * | 2/2016 | Heidrich | G01N 21/7746 356/480 |
| 2017/0276870 A1 * | 9/2017 | Snyman | G01P 5/20 |
| 2019/0011253 A1 | 1/2019 | Ding et al. | |
| 2021/0018431 A1 | 1/2021 | Viegas et al. | |
| 2021/0164853 A1 | 6/2021 | Vez et al. | |
| 2021/0172833 A1 | 6/2021 | Ahmed | |
| 2021/0278289 A1 | 9/2021 | Nasilowski et al. | |
| 2021/0333089 A1 | 10/2021 | Han | |
| 2021/0381906 A1 | 12/2021 | Tadayon et al. | |
| 2021/0381908 A1 | 12/2021 | Tadayon et al. | |

OTHER PUBLICATIONS

U.S. Appl. No. 17/338,454, filed Jun. 3, 2021.
U.S. Appl. No. 18/186,801, filed Mar. 20, 2023.
International Search Report and Written Opinion for Application No. PCT/US2021/035767, dated Sep. 28, 2021, 14 pages.
Xu, H. et al., "Ultra-sensitive chip-based photonic temperature sensor using ring resonator structures", Optics Express, 22(3), 3098-3104, 2014, 7 pages.
Klimov, N. N. et al., "On-Chip Silicon Waveguide Bragg Grating Photonic Temperature Sensor", Optics Letters, 40(17), 3934-3936, 2015, 4 pages.
Klimov, N. et al., "Towards Replacing Resistance Thermometry with Photonic Thermometry", Sensors and Actuators A: Physical, 269, 308-312, 2018, 7 pages.
Paschotta, R., "Free Spectral Range", RP Photonics Encyclopedia, https://www.rp-photonics.com/free_spectral_range.html, downloaded Mar. 20, 2023, 4 pages.
Paschotta, R., "Resonator Modes", RP Photonics Encyclopedia, https://www.rp-photonics.com/resonator_modes.html, downloaded Mar. 20, 2023, 8 pages.
International Search Report and Written Opinion of the International Searching Authority for International Application No. PCT/US2022/082640, dated Apr. 11, 2023, 12 pages.

* cited by examiner

PHOTONIC DEVICE USING RESONATOR DIFFERENCING TECHNIQUE

BACKGROUND

Technical Field

The present disclosure relates to photonic devices and methods, and in particular to photonic devices and methods for measuring a physical condition, such as temperature.

Description of the Related Art

Photonic thermometers are a class of temperature measurement systems that detect characteristics of light in a sensor to obtain a temperature measurement. These systems are valued for their size, robustness, accuracy, precision, and potential range of applications. However, certain deficiencies are associated with these temperature measurement systems.

The response characteristics of some measurement devices used to detect the characteristics of light in a photonic thermometer drift over time. As a result, operation of the measurement systems may involve periodic recalibration to achieve consistent performance over time. Some classes of measurement devices used in these systems can be expensive and may be limited in resolution. Variations in ambient temperature can also significantly affect operation of these measurement devices, so exposure of these measurement devices to temperature variations can introduce uncertainty in the measurements obtained.

BRIEF SUMMARY

Disclosed herein are systems and methods in which a photonic device has one or more optical resonators having a first resonant frequency response relative to temperature and a different second resonant frequency response relative to temperature. In cases where the photonic device is implemented in an optical thermometer, a difference in resonant frequency produces an output signal with a beat frequency that is indicative of a temperature of the photonic device.

In various embodiments, a photonic system of the present disclosure comprises a photonic device including a substrate, a first optical resonator in or on the substrate and having a first resonant frequency response relative to temperature, a second optical resonator in or on the substrate and having a second resonant frequency response relative to temperature, a first waveguide optically coupled to receive a first light beam and being optically coupled to the first optical resonator, and a second waveguide optically coupled to receive a second light beam and being optically coupled to the second optical resonator. The photonic system further includes a detector configured to convert output light from the photonic device into an electric signal. The detector may be a photodetector, a wavelength meter or wavemeter, or other detection circuitry configured to detect an aspect of the output light, such as intensity, wavelength, frequency, etc. The detector converts the output light into an electric signal by producing an electric signal that represents the detected aspect of the output light.

The photonic system may further comprise an optical combiner configured to combine first output light from the first waveguide and second output light from the second waveguide into combined light, wherein the combined light is the output light of the photonic device, and one or more measurement devices configured to measure a characteristic of the electric signal. The characteristic of the electric signal corresponds to or is otherwise indicative of a physical condition of the photonic device, such as a temperature of the photonic device.

In various embodiments, a method of operating a photonic device may comprise directing a first light beam into a first waveguide of a the photonic device, directing a second light beam into a second waveguide of the photonic device, determining a frequency difference between the first output light from the first waveguide and the second output light from the second waveguide, and determining a temperature of the photonic device based on the frequency difference. In some cases, the first output light from the first waveguide and second output light from the second waveguide may be combined into combined light, and the frequency difference is determined based on the combined light.

The method may further comprise locking a frequency of the first light beam to a first resonance resonant frequency of a first optical resonator in the photonic device, and locking a frequency of the second light beam to a second resonance resonant frequency of a second optical resonator in the photonic device. The frequency difference may be determined subsequent to the frequency of the first light beam being locked to the first resonant frequency and the frequency of the second light beam being locked to the second resonant frequency.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes and orientation of various elements are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

Figure 1A:
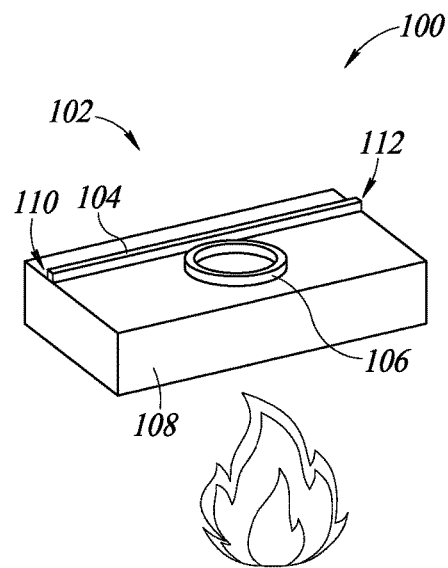
FIG. 1A is a perspective view of one example of a photonic device that is usable for temperature measurement.

FIG. 1A depicts at least one embodiment of a system 100 including a photonic device 102 that may be used, for example, in a photonic thermometer for measuring temperature. The photonic device 102 includes a substrate 108 having an optical resonator 106 and a waveguide 104 proximate to the optical resonator 106. The photonic device 102 is useable to measure temperature based on a resonant frequency of the optical resonator 106 that changes due to thermo-optic effects of the optical resonator 106, such as changes in the refractive index of the material forming the optical resonator 106 corresponding to changes of the temperature of the photonic device 102. The waveguide 104 is a conduit for light that includes a first port 110 and a second port 112 on the substrate 108 for communicating light into and out of the waveguide 104.

The substrate 108 supports the optical resonator 106 and the waveguide 104 in a fixed relationship. The substrate 108 (including the waveguide 104 and the optical resonator 106) may be formed of a material having optically transparent properties such that at least a portion of light entering into the waveguide 104 is directed into the optical resonator 106 via internal reflection in the waveguide 104. For instance, the substrate 108 may be formed of a material that includes silicon, such as silicon dioxide, a silicate (e.g., borosilicate glass, lead glass, aluminum silicate), carbonate (e.g., sodium carbonate), glass-ceramics, amorphous metal, or silica-free glasses, by way of non-limiting examples. The substrate 108 may be formed of other suitable materials based on a desired application or properties of the photonic device 102. The photonic device 102, including the substrate 108, the waveguide 104, and the optical resonator 106, may be formed using various fabrication methods, such as lithography methods (e.g., photolithography, e-beam lithography, embossing, direct pattern writing, 3D printing), film deposition, film growth, and film etching, by way of non-limiting examples.

Figure 2A:
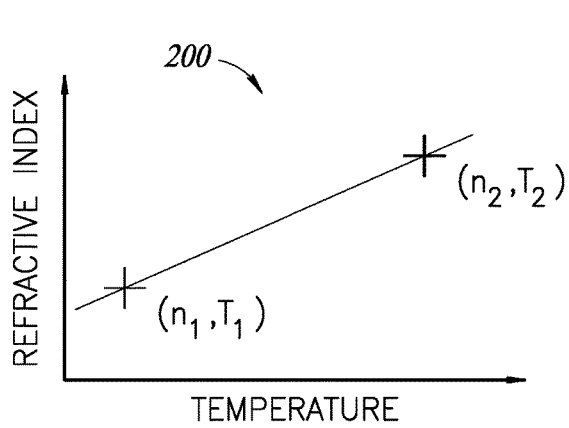
FIG. 2A is a diagram showing a change of refractive index of the photonic device of FIG. 1A relative to temperature.

FIG. 2A shows a diagram 200 depicting a relationship between refractive index and temperature of the substrate 108. The diagram 200, more particularly, depicts a relationship between refractive index, n, and temperature, T, of a substrate 108 formed of silicon. As shown, the change in refractive index n of the substrate 108 is directly proportional to the change in temperature T. For instance, the refractive index n of the substrate 108 may change linearly relative to the temperature T of the substrate 108. The substrate 108 may have optical properties with different response characteristics to temperature in some embodiments.

Referring back to FIG. 1A, the optical resonator 106 is optically coupled to the waveguide 104 in at least some embodiments. In some embodiments, the waveguide 104 is spaced apart from the optical resonator 106. At least a portion of the light that enters the waveguide 104 via the first port 110 is received into the optical resonator 106. A characteristic of the light within the optical resonator 106 is modified and the modified light is coupled back into the waveguide 104. The modified light travels through the remainder of the waveguide 104 along with original light in superposition. The modified light and original light are output from the second port 112 of the waveguide 104.

Figure 1B:
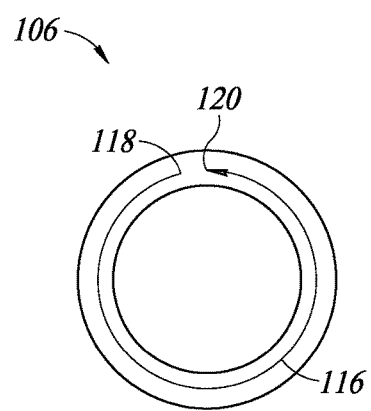
FIG. 1B is a top view of an optical resonator of the photonic device of FIG. 1A.

FIG. 1B shows an light path 116 of the optical resonator 106. In particular, the optical resonator 106 has an annular or toroidal shape. The light path 116 extends in a circumferential direction through a cross-sectional center of the optical resonator 106. In operation, light coupled into the optical resonator 106 enters the optical resonator 106 at a first point 118, and is internally reflected between internal surfaces of the optical resonator 106 along the light path 116. The light exits the optical resonator 106 from a second point 120. A characteristic of the light traveling through the optical resonator 106 may be modified relative to light traveling through the waveguide 104. Those skilled in the art will understand there may be different first points 118 and second points 120 at which different rays of light are respectively coupled into and out of the optical resonator 106. The modified light is coupled back into the waveguide 104 from the second point 120 and exits from the waveguide 104 along with the original light.

As a result of change in the temperature experienced by the photonic device 102 and consequent change in refractive index n, an effective length of the light path 116 may change. For example, the effective length of the light path 116 may change according to the following equation:

$$L_{\textit{eff}}(T) = n_{\textit{eff}}(T)L$$

where $L_{\textit{eff}}$ is the effective length of the light path 116, T is the temperature experienced by the photonic device 102, and n is the refractive index of the substrate 108. As can be seen, the effective length $L_{\textit{eff}}$ of the light path 116 changes due to changes in the temperature T experienced by the photonic device 102. The length $L_{\textit{eff}}$ may increase with a corresponding increase in temperature, for instance.

Figure 2B:
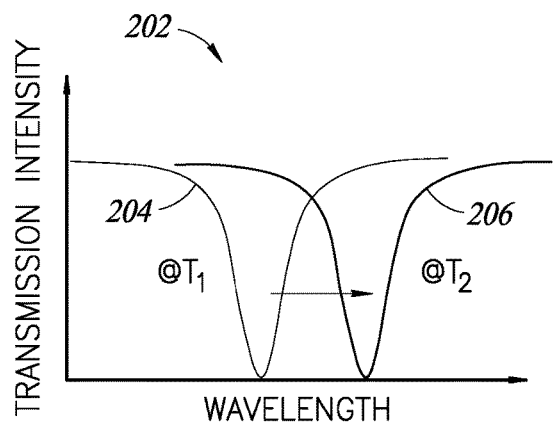
FIG. 2B is a diagram showing a change of resonant response of the photonic device of FIG. 1A relative to temperature.

The change in effective length $L_{\textit{eff}}$ causes a corresponding change in the light in the optical resonator 106. FIG. 2B shows a diagram 202 depicting a change in characteristics of the light output from the second port 112 as a result of the change in temperature. For instance, the intensity of the modified light may have a first profile 204 relative to wavelength at a first temperature, and have a second profile 206 relative to wavelength at a second temperature.

Existing thermal measurement systems, or photonic thermometers, may include the photonic device 102 and a wavelength meter coupled to receive light that is output from the second port 112 of the photonic device 102. The wavelength meter may analyze the wavelength of the light, and detect a resonance thereof, to determine the temperature of the photonic device 102 based on a known relationship of resonance and temperature of the photonic device 102. However, presently-known wavelength meters are expensive to procure and maintain. Wavelength meters may also experience significant drift over time, which has an adverse effect on calibration of the system as a whole. Periodic recalibration of the system may be required to ensure accurate measurement over time. Significant training and scientific knowledge are therefore appropriate for persons using such measurement systems, which increases the cost and complexity associated with operating such systems.

Figure 3:
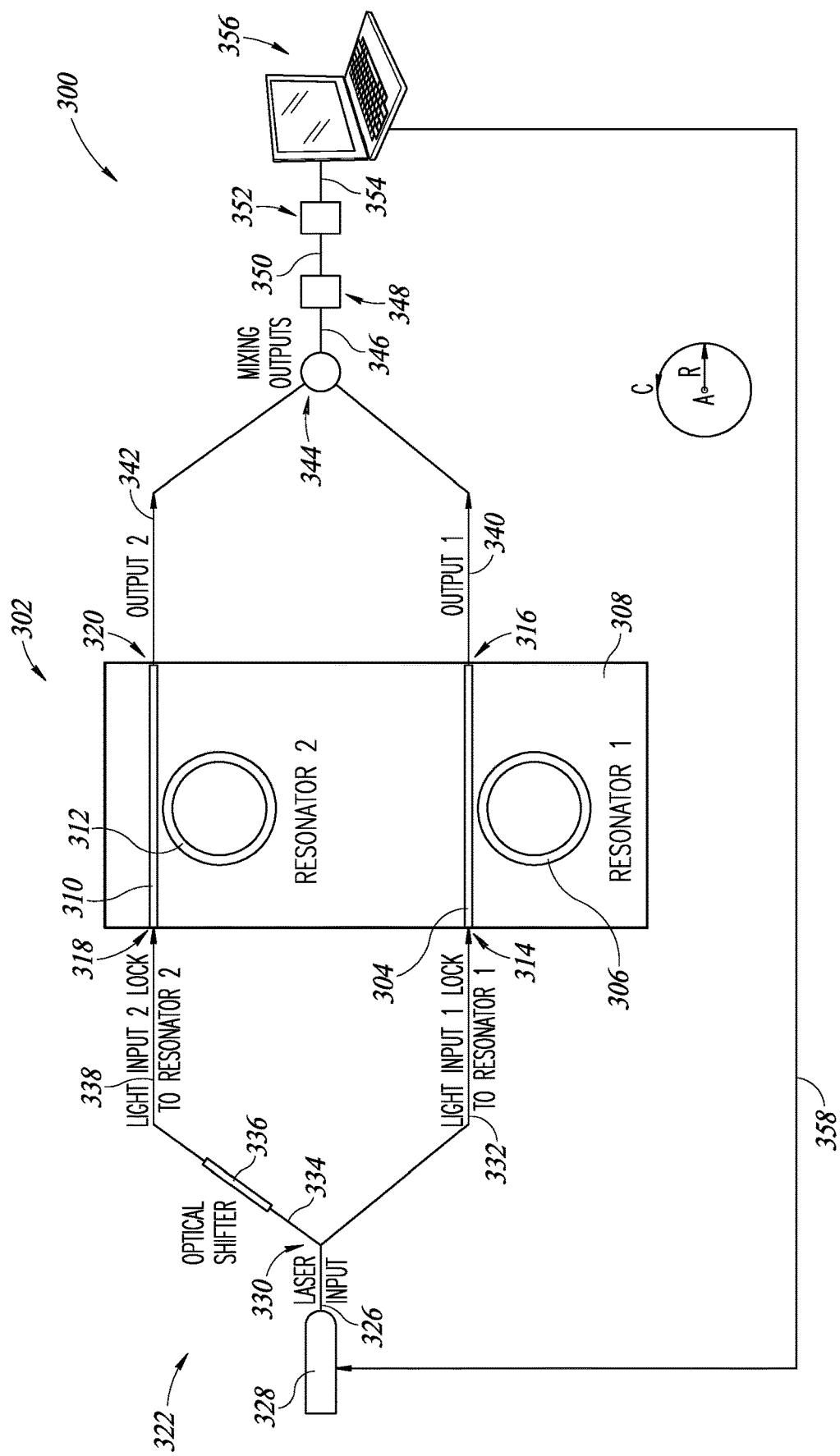
FIG. 3 is a schematic block diagram of a measurement system that includes a photonic device according to one or more embodiments of the present disclosure.

FIG. 3 is a schematic block diagram of a measurement system 300 that includes a photonic device 302 operating as a photonic thermometer according to one or more embodiments of the present disclosure. The photonic device 302 includes a first waveguide 304 and a first optical resonator 306 in or on a substrate 308, wherein the first optical resonator 306 is optically coupled to the first waveguide 304. The photonic device 302 also includes a second waveguide 310 and a second optical resonator 312 in or on the substrate 308, wherein the second optical resonator 312 is optically coupled to the second waveguide 310. The second waveguide 310 is spaced apart from and defines a separate optical path than the first waveguide 304. In some embodiments, the first waveguide 304, the first optical resonator 306, the second waveguide 310, and the second optical resonator 312 are constructed on the same chip.

Light introduced to the photonic device 302 may travel through the first waveguide 304 between a first port 314 and a second port 316, which are provided or exposed on an exterior of the substrate 308. Light introduced to the photonic device 302 may also travel through the second waveguide 310 between a first port 318 and a second port 320, which may also be provided or exposed on the exterior of the substrate 308. In some embodiments, one or both of the first ports 314, 318 or one or both of the second ports 316, 320 may include one or more grating couplers or other type of couplers configured to couple input light into the first waveguide 304 or the second waveguide 310. In some embodiments, one or both of the first or second waveguides 304, 310 may have another shape at one or both of the first ports 314, 318 or one or both of the second ports 316, 320 to facilitate efficient coupling of light. In some embodiments, one or both of the first ports 314, 318 or one or both of the second ports 316, 320 may be configured for edge coupling of light into or out of one or both of the first or second waveguides 304, 310.

The photonic device 302, including the substrate 308, the first optical resonator 306, and the second optical resonator 312, may be fabricated using various materials. Non-limiting examples of such materials include silicon, silicon nitride, silicon dioxide (a.k.a. silica, oxide, quartz, fused silica), gallium arsenide, sapphire (alumina, aluminum oxide), germanium, fluoride materials, bromide materials, and chloride materials. The photonic device 302, including the substrate 308, the first optical resonator 306, and the second optical resonator 312, may be formed using various fabrication methods, such as lithography methods (e.g., photolithography, e-beam lithography, embossing, direct pattern writing, 3D printing), film deposition, film growth, and film etching, by way of non-limiting example.

The second optical resonator 312 is spaced apart from the first optical resonator 306. The first optical resonator 306 and the second optical resonator 312 are optically decoupled from each other such that light in one of the optical resonators is not coupled into the other optical resonator. The first optical resonator 306 and the second optical resonator 312, in some embodiments, are the same type of optical resonator. However, one or more aspects of the second optical resonator 312 are different than the first optical resonator 306. As a result, the second optical resonator 312 has a different resonant frequency response relative to a temperature range than the first optical resonator 306.

There are numerous ways of creating a difference in resonant frequency response between the first optical resonator 306 and the second optical resonator 312. For example, one or more thin-film regions may be positioned around one of the first optical resonator 306 or the second optical resonator 312 and not the other, or thin-film regions of different sizes or compositions may be positioned around both of the first optical resonator 306 and the second optical resonator 312. A mechanical stress on or around the first optical resonator 306 may be different than the mechanical stress on or around the second optical resonator 312. A different temperature may be applied to each of the first optical resonator 306 and the second optical resonator 312 using passive heat mechanisms (e.g., chip design) or by active heat mechanisms (e.g., microheater). As a further example, the refractive index of the first optical resonator 306 may be different than the refractive index of the second optical resonator 312 using active or passive refractive index variation, such as varying the type or concentration of dopant(s) used to create the first optical resonator 306 and the second optical resonator 312. Those of ordinary skill in the art will understand that there are myriad ways in which differences in resonant frequency response between the first optical resonator 306 and the second optical resonator 312 can be implemented without deviating from the scope of the present disclosure.

The different resonant frequency response of the second optical resonator 312 relative to the first optical resonator 306 may be due to one or more differences in size of the second optical resonator 312 relative to the first optical resonator 306. For instance, the first optical resonator 306 and the second optical resonator 312 may have different values in one or more dimensions. For instance, the first optical resonator 306 and the second optical resonator 312 may have different optical path lengths (in the circumferential direction C shown in FIG. 3), different thicknesses (in the axial direction A shown in FIG. 3), or different widths (in the radial direction R shown in FIG. 3). As a non-limiting example, the first optical resonator 306 may have an optical path length of 186.572 μm and the second optical resonator 312 may have an optical path length of 186.800 μm. As another non-limiting example, the first optical resonator 306 may have a width of 533 nm and the second optical resonator 312 may have a width of 530 nm. Thus, the first and second optical resonators 306 and 312 may have different optical resonant frequencies relative to temperature due to differences in dimensions.

The different resonant frequency response of the second optical resonator 312 relative to the first optical resonator 306 may be due to one or more differences in material of the second optical resonator 312 relative to the first optical resonator 306. The second optical resonator 312 may, for instance, include a different material than the first optical resonator 306. The second optical resonator 312 may include a layer of additional cladding that is not included in the first optical resonator 306. As a specific, non-limiting example, the first optical resonator 306 may be formed on a layer of silicon oxide ($SiO_2$). The second optical resonator 312 may include additional materials, such as a layer of aluminum oxide ($Al_2O_3$) formed on the silicon oxide layer, whereas the first optical resonator 306 does not include an aluminum oxide layer or has an aluminum oxide layer of a different thickness.

The difference in materials may be a difference in the material of the core of the first optical resonator 306 and the material of the core of the second optical resonator 312. The difference in materials may be a difference in the material of the cladding of the first optical resonator 306 and the material of the cladding of the second optical resonator 312. The differences in the cores or claddings of the first and second optical resonators 306 and 312 may be types or compositions of the materials, optical properties of the materials, concentration of material, or other differences.

The resonant wavelength of the first optical resonator 306 and the second optical resonator 312 may be calculated using the following equations:

$$\lambda_1 = \frac{n_1 l_1}{m_1}, \lambda_2 = \frac{n_2 l_2}{m_2}$$

where $l_i$ is the length of the respective optical resonator, $n_i$ is the refractive index of the respective resonator, and $m_i$ is the mode number of the respective resonator.

The slope of the curve representing the change of resonant wavelength relative to temperature of the first optical resonator 306 and the second optical resonator 312 may change with respect to temperature. In particular, the change in slopes of the resonant wavelength curve of the first optical resonator 306 and the second optical resonator 312 are represented by the following equations:

$$\frac{d\lambda_1}{dT} = \frac{l_1}{m_1}\frac{dn_1}{dT}, \frac{d\lambda_2}{dT} = \frac{l_2}{m_2}\frac{dn_2}{dT}$$

where $$\frac{d\lambda}{dT}$$

is a change in wavelength relative to change in temperature of a respective optical resonator, $$\frac{dn}{dT}$$

is the change in refractive index relative to change in temperature of a respective optical resonator, l is the length of a respective optical resonator, and m is a mode number of a respective optical resonator. In order to achieve a proper beat frequency $f_{beat}$ with respect to temperature change, as will be described in greater detail below, an appropriate mode number m, optical resonator length l, and effective refractive index n are determined in accordance with the foregoing relationships. The different characteristics of the first and second optical resonators 306 and 312 result in a different resonant frequency response between the first and second optical resonators 306 and 312.

Figure 4A:
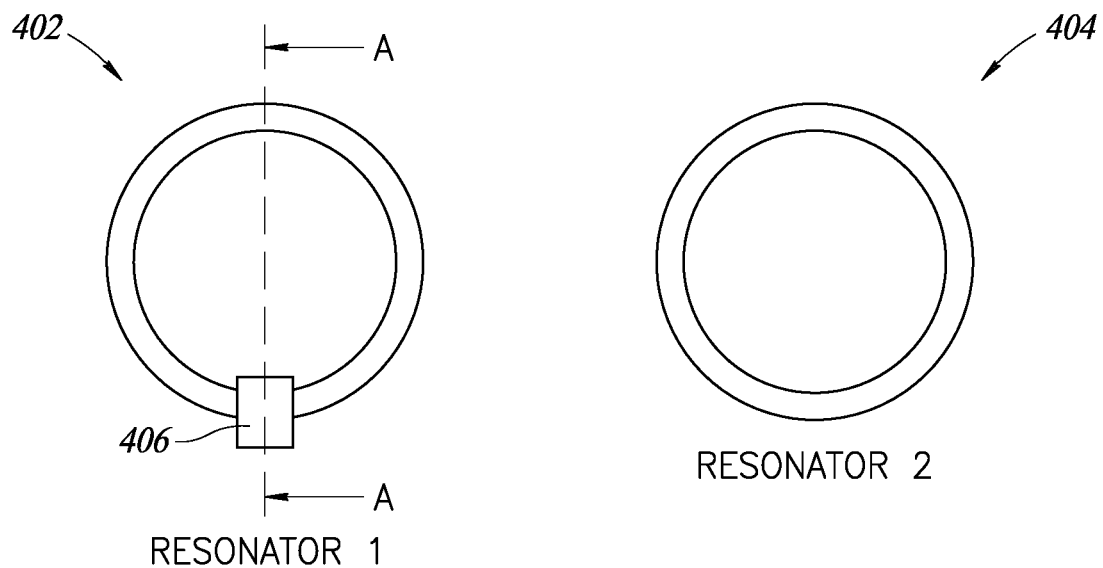
FIG. 4A is a top view of a first optical resonator and a second optical resonator of the photonic device of FIG. 3.

The different resonant frequency response of the second optical resonator 312 relative to the first optical resonator 306 may be due to one or more differences in structure of the second optical resonator 312 relative to the first optical resonator 306. As an example, FIG. 4A shows a top view of a first optical resonator 402 and a second optical resonator 404, wherein the first optical resonator 402 has a structural feature that is absent from the second optical resonator 404. The first optical resonator 402 in particular has a section 406 on or in the optical path of the first optical resonator 402.

Figure 4B:
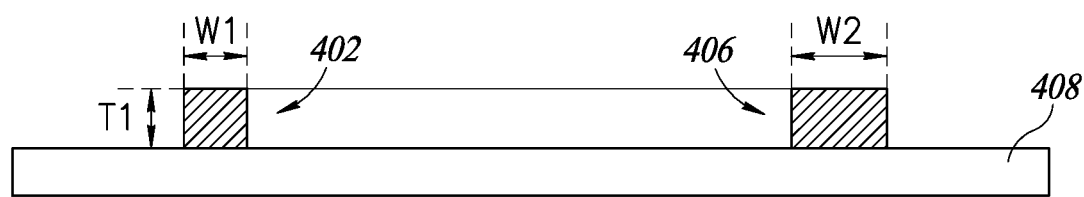
FIG. 4B is a cross-sectional view of the first optical resonator taken along the line A-A of FIG. 4A.

FIG. 4B shows a cross-sectional view of the first optical resonator 402 taken along the line A-A of FIG. 4A. The first optical resonator 402 is formed on a substrate 408. The section 406 is formed on or in a portion of the optical path of the first optical resonator 402. The first optical resonator 402 may have a width W1 and a thickness T1. The section 406 shown in FIGS. 4A and 4B has one or more attributes that are different than the rest of the first optical resonator 402. The difference may be a difference in dimension or size, materials in or around the section 406, mechanical stress, or other attributes described above with respect to FIG. 3 that change the resonant frequency of the first optical resonator 402 relative to an optical resonator without the section 406.

For example, in FIG. 4B, the section 406 has a width W2 that is different than the width W1 of the rest of the first optical resonator 402. The difference in dimension may include a difference in the thickness T1. The other dimensions of the first optical resonator 402 and the second optical resonator 404 may otherwise be the same. In some embodiments, the section 406 may be formed on top of the first optical resonator 402, or may be formed between the first optical resonator 402 and the substrate 408, or formed on or near a side of the first optical resonator 402 laterally in the width direction. In some embodiments, the section 406 may have a different cross-sectional shape than the rest of the first optical resonator 402. For example, the section 406 may have a circular cross-sectional shape whereas the rest of the first optical resonator 402 has a rectangular cross-sectional shape.

Referring back to FIG. 3, the measurement system 300 includes an input portion 322 coupled to the first ports 314 and 318, and includes an output portion 324 coupled to the second ports 316 and 320. The input portion 322 includes a light source 328 that generates light 326. The light source 328 may be a tunable light source that is controllable to adjust a frequency of the light 326. For instance, the light 326 may have a first frequency $f_1$ at a first time and the light source 328 may be operated to adjust the light 326 to have a second frequency $f_2$ at a second time.

In some embodiments, the light source 328 is a laser light source that generates laser light. The laser light source may be, by way of non-limiting example, a telecom C band laser that generates laser light in a wavelength range between 1530 nm and 1565 nm, inclusive. The light source 328 may generate light in other spectrums, including visible spectrum light, near-infrared light, mid-infrared light, and far-infrared light, X-ray spectrum light, and ultra-violet spectrum light, also by way of non-limiting example. Radiofrequency electromagnetic sources may be used in some embodiments. The light source 328 may be a continuous-wave narrow band laser light source, a frequency comb light source, a broadband light source, a pulsed light source, a coherent light source, an incoherent light source, or any other type of light source that is operable to produce light compatible with optical resonance in the photonic device 302.

The light 326 is directed into an optical element 330, which splits the light 326 into a first input light 332 and an auxiliary light 334. The optical element 330 may be a beam splitter that splits the beam into two beams of light—the first input light 332 and the auxiliary light 334—having the same optical characteristics. The auxiliary light 334 is directed into an optical shifter 336, which shifts a frequency of the auxiliary light 334 by a fixed frequency amount fs. The optical shifter 336 may shift a phase of the auxiliary light 334 in some embodiments. The optical shifter 336 outputs a second input light 338 having a third frequency $f_3$ different than a second frequency $f_2$ of the first input light 332. The optical shifter 336 may, in some embodiments, include one or more passive devices including optical elements that do not consume electrical power to achieve the shift in the characteristic of the auxiliary light 334. The optical shifter 336 may, for example, include a material having a crystalline structure that changes the frequency of light passing therethrough. In some embodiments, the optical shifter 336 includes active devices (e.g., frequency modulators) that consume electrical power to achieve the shift in characteristic. In such embodiments, the optical shifter 336 may be controlled to adjust a frequency of the second input light 338 to a resonant frequency of the second optical resonator 312.

The frequency of the light 326 from the light source 328 may be adjusted from a first frequency $f_1$ to a second frequency $f_2$, which may be a resonant frequency of the first optical resonator, and split by the optical element 330 to provide the first input light 332. The frequency of the first input light 332 is locked to the second frequency $f_2$, which is a resonant frequency of the first optical resonator 306 for a particular temperature and mode number (e.g., mode number of 300 at a temperature of −200° C.). The frequency of the second input light 338 is adjusted and locked to the third frequency $f_3$, which is a resonant frequency of the second optical resonator 312 for the same particular temperature and mode number (e.g., mode number of 300 at a temperature of −200° C.). In some embodiments, the optical shifter 336 is selectively controllable to change the frequency amount fs by which the auxiliary light 334 is shifted. In some embodiments, the optical shifter 336 shifts the auxiliary light 334 by a fixed frequency amount fs relative to the first input light 332. In such embodiments, the resonant frequencies of the first optical resonator 306 and the second optical resonator 312 may be separately determined in the output of the photonic device 302. A frequency difference between first output light from the first waveguide 304 and second output light from the second waveguide 310 may be determined, and based on the frequency difference, a physical condition of the photonic device 302, such as temperature, may be determined.

In operation, the frequency of the light source 328 may be swept or changed from the first frequency $f_1$ to the second frequency $f_2$ over a period of time. For instance, the light source 328 may be controlled such that the light 326 emitted has a first frequency $f_1$ at a first time. The light source 328 is controlled to increase or decrease the frequency of the emitted light 326 over a time period until the light 326 has the second frequency $f_2$ that is the resonant frequency of the first optical resonator 306 at the current temperature of the photonic device 302.

The frequency of the auxiliary light 334 changes along with the frequency of the first input light 332, since both the auxiliary light 334 and the first input light 332 are split from the source light 326. The optical shifter 336 may change the frequency of the second input light 338 relative to the auxiliary light 334 by the frequency amount fs. The frequency of the light 326 may be adjusted continuously or stepwise in defined increments. As described herein, the output of the photonic device 302 is evaluated to identify the resonant frequencies of the first and second optical resonators 306 and 312, the resonant frequencies being used to determine a temperature of the photonic device 302. The input portion 322 may include an optical frequency locked loop that controls the frequency of the second light input 338 relative to the frequency of the first input light 332.

The temperature of the photonic device 302 may be determined by accessing temperature correspondence data stored in a memory. In some embodiments, the temperature of the photonic device 302 is determined based on the resonant frequencies of the first and second optical resonators 306 and 312. In some embodiments, the temperature is determined based on a correspondence between a frequency difference of the resonant frequencies and the temperature, as reflected in the temperature correspondence data. The temperature correspondence data may include a look-up table and/or a function (i.e., a formula or equation) that represents the correspondence of the resonant frequencies (or an aspect, combination, or difference thereof) with the temperature of the photonic device 302.

In some embodiments, the measurement system 300 may include a second light source (not shown) that generates the second input light 338. In such embodiments, the measurement system 300 may exclude the optical element 330 and the optical shifter 336. For example, the first light source and the second light source may be separate or separately operable laser light sources that each generate laser light. The second input light 338 generated by the second light source is directed into the second waveguide 310 via the first port 318. The first input light 332 is generated by the light source 328 and directed into the first waveguide 304 via the first port 314. The light source 328 and the second light source are separately controlled to adjust the frequency of the first input light 332 and the second input light 338. In particular, the frequency of the first input light 332 is locked to the resonant frequency of the first optical resonator 306 and the frequency of the second input light 338 is locked to the resonant frequency of the second optical resonator 312. The second light source may be substantially similar to the light source 328, so further description thereof is omitted.

The first input light 332 is directed or introduced into the first waveguide 304 and the second input light 338 is directed or introduced into the second waveguide 310. When the first input light 332 has a frequency corresponding to the resonant frequency of the first optical resonator 306, the first optical resonator 306 resonates at least a portion of the first input light 332, which causes a corresponding change in a characteristic (e.g., amplitude) of first output light 340 that is output from the second port 316. When the second input light 338 has a frequency corresponding to the resonant frequency of the second optical resonator 312, the second optical resonator 312 resonates at least a portion of the second input light 338, which causes a corresponding change in a characteristic (e.g., amplitude) of second output light 342 that is output from the second port 320. The first optical resonator 306 is optically decoupled from the second optical resonator 312 such that the first optical resonator 306 and the second optical resonator 312 do not exchange light through the substrate 308 or otherwise.

In some embodiments, the output portion 324 includes an optical combiner 344 that combines or mixes the first output light 340 ("output 1") and the second output light 342 ("output 2") into combined light 346. The optical combiner 344 is an optical element, such as a beam combiner or dichroic mirror, that combines the first output light 340 and the second output light 342 into a single beam of light, namely the combined light 346. In embodiments where an optical combiner 344 is not used, the resonance wavelength of each optical resonator 306, 312 may be separately determined from the first output light 340 and the second output light 342 (e.g., by producing separate electric signals representing the detected resonance wavelength of each optical resonator 306, 312), and the wavelength (frequency) difference of the two optical resonators 306, 312 is used to determine the temperature of the photonic device 302.

The combined light 346 has a beat frequency $f_{beat}$ that corresponds to the frequency difference between the first output light 340 and the second output light 342 due to constructive and destructive interference between the first output light 340 and the second output light 342. The output portion 324 includes a photodetector 348 that generates an electric signal 350 corresponding to one or more characteristics of the combined light 346. The electric signal 350, in particular, has a frequency corresponding to the beat frequency $f_{beat}$ of the combined light 346. A frequency range of the electric signal 350 may have a known or ascertainable relationship with a physical condition of the photonic device 302, such as a temperature range of the photonic device 302, such that a frequency of the electric signal 350 is indicative of a temperature of the photonic device 302. In other embodiments, for example, the physical condition of the photonic device 302 may be a pressure, strain, stretch, or compression of the material forming the photonic device, which causes a change in the resonant frequencies of the first and second optical resonators 306, 312 and produces a corresponding change in the electric signal 350. In such cases, the frequency of the electric signal 350, for example, may be indicative of the pressure, strain, stretch, or compression experienced by the photonic device 302.

The output portion 324 includes one or more electrical measurement devices 352 that measures one or more characteristics of the electric signal 350. Such characteristic(s) of the electric signal 350 are indicative of the physical condition of the photonic device 302. The one or more electrical measurement devices 352 may include measurement devices that measure a frequency of the electric signal 350, such as a frequency counter, or measure an energy distribution in a frequency spectrum of the electric signal 350, such as a spectrum analyzer, by way of non-limiting example. The measurement device(s) 352 generate(s) an output 354, such as data or a numerical visual indication (e.g., on a display), representative of the one or more characteristics measured in the electric signal 350. The measurement device(s) 352 may determine other characteristics of the electric signal 350, such as amplitude. The one or more measurement devices 352 may be used to determine one characteristic relative to another characteristic in the electric signal 350, such as an amplitude relative to a frequency of the electric signal 350, or changes in one characteristic relative to another characteristic in the electric signal 350, such as an amplitude change relative to a frequency in the electric signal 350. Embodiments including a spectrum analyzer may analyze the energy distribution in a frequency spectrum of the electric signal and measure a magnitude of the energy distribution in the frequency spectrum relative to a frequency in the frequency spectrum.

In some embodiments, the output portion 324 may include a computer system 356 configured to determine a temperature that corresponds to the beat frequency $f_{beat}$ represented by the electric signal 350 as measured by the measurement device(s) 352. The computer system 356 may include one or more processors coupled to memory storing instructions that, as a result of execution by the one or more processors, cause the computer system 356 to determine the temperature of the photonic device 302. The memory of the computer system 356 may store information indicating relationships between frequency measurements and temperatures of the photonic device 302. In some embodiments, the computer system 356 may be a specially designed system that includes one or more features of the input portion 322 and the output portion 324.

In some embodiments, the photonic device 302 may include one or more light sources, such as the light source 328, that internally generate the first input light 332 and the second input light 338. The one or more light sources internal to the photonic device 302 may be controllable by an external device, such as the computer system 356, to adjust the frequency of the first input light 332 and the frequency of the second input light 338. The photonic device 302 may include one or more optical shifters or optical frequency locked loops that are controllable to adjust the frequencies of the second input light 338 relative to the first input light 332.

In some embodiments, the photonic device 302 may include the photodetector 348. In such embodiments, the photonic device 302 may include the optical combiner 344, and the first output light 340 and the second output light 342 may be combined into the combined light 346 within the photonic device 302. The combined light 346 is directed onto or into the photodetector 348 within the photonic device 302 to generate the electric signal 350, which is outputted from the photonic device 302 instead of or in addition to the combined light 346.

Figure 5:
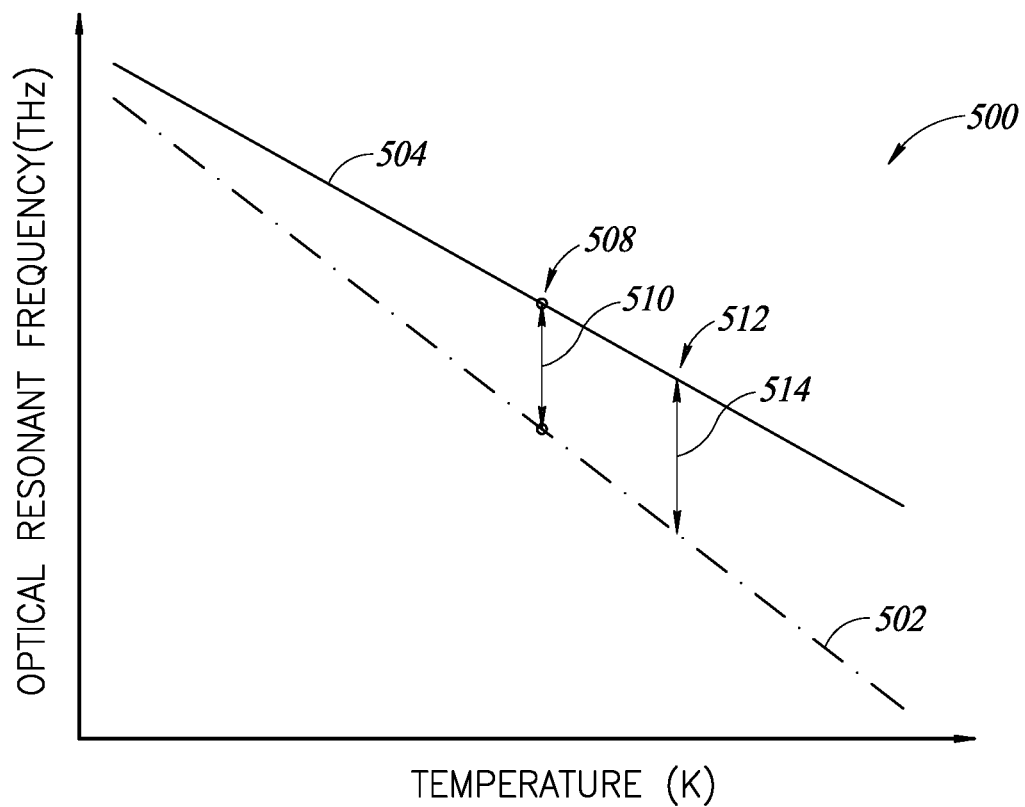
FIG. 5 is a graph showing a change of optical resonant frequency of the first optical resonator and the second optical resonator of the photonic device of FIG. 3 relative to temperature.

FIG. 5 is a graph 500 showing one example of a change of optical resonant frequency relative to temperature of optical resonators of a photonic device according to one or more embodiments of the present disclosure. The graph 500 includes a trend line 502 of a resonant frequency response of a first optical resonator, such as the first optical resonator 306. The graph 500 also includes a trend line 504 of a resonant frequency response of a second optical resonator, such as the second optical resonator 312. The trend lines 502 and 504 demonstrate that the resonant frequencies of the first optical resonator and the resonant frequency of the second optical resonator change based on changes in temperature. For instance, the resonant frequency response of the first and second optical resonators may be inversely proportional to temperature such that the optical resonators have a higher resonant frequency at lower temperatures and a lower resonant frequency at higher temperatures.

The trend line 502 for the first optical resonator is different than the trend line 504 for the second optical resonator. The slope of the trend line 502, for example, is different than the slope of the trend line 504. In some embodiments, the shape of the trend line 502 may be different than the shape of the trend line 504. Therefore, the differences between the optical resonant frequencies of the first and second optical resonators vary based on temperature. At a temperature 508, for example, there is a first difference 510 between the optical resonant frequencies of the first optical resonator and second optical resonator. At another temperature 512, there is a second difference 514 between the optical resonant frequencies of the first optical resonator and second optical resonator, wherein the second difference 514 is different than the first difference 510.

The resonant frequency responses of the optical resonators may drift over time. The trend lines 502 and 504 may, for instance, drift upward or downward along the optical resonant frequency axis over time. However, the trend lines 502 and 504 of the optical resonant frequencies will drift together. As a result, even if the resonant frequency responses of the first and second optical resonators 306 and 312 drift over time, temperature measurements using the photonic device 302 can continue to be accurately and precisely obtained based on a difference between the resonant frequencies of the optical resonators without recalibration of the measurement system 300. By contrast, if the optical resonator 106 of the photonic device 102 in FIG. 1A experiences drift in resonant frequency response, recalibration of a measurement system implementing the photonic device 102 may be needed to continue to obtain accurate and precise temperature measurements.

Moreover, the measurement system 300 is less expensive and more reliable than a measurement system implementing the photonic device 102. In a measurement system used to determine a temperature of the photonic device 102, a wavelength meter may be used to detect a wavelength of the light output by the photonic device 102. However, ambient temperature may have a significant effect on operation of such wavelength meters, which may reduce the certainty of temperature measurements obtained using such devices. Some characteristics of wavelength meters are also subject to drift over time, so periodic calibration is appropriate to maintain sufficient accuracy and precision of the system.

Due to the design of the photonic device 302, by which a difference in resonant frequencies of the first and second optical resonators 306 and 312 is detected, a temperature of the photonic device 302 may be determined without the use of a wavelength meter. As a result, the measurement system 300 may have improved accuracy and precision over a longer period of time, may be less expensive to manufacture and operate, and may involve less maintenance (e.g., calibration) relative to measurement systems implementing the photonic device 102 in FIG. 1A. Potential benefits or improvements of the measurement system 300 include improved resolution, lower cost, improved robustness to variation in ambient temperature, and less frequent calibration.

Figure 6:
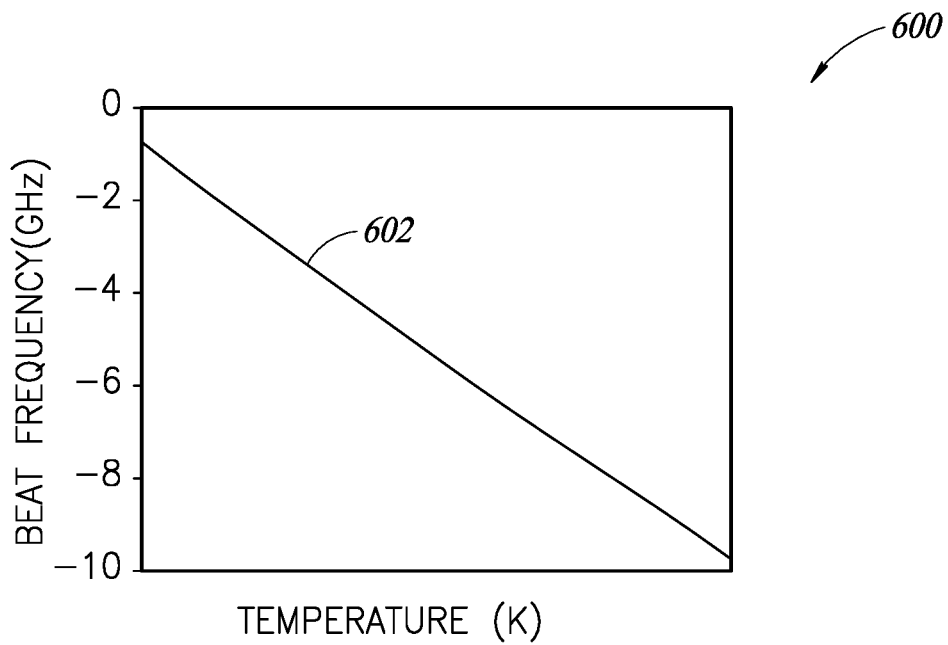
FIG. 6 is a graph showing a change of beat frequency of the photonic device of FIG. 3 relative to temperature.

FIG. 6 shows a graph 600 of a beat frequency curve 602 of the combined light 346 relative to a temperature range of the photonic device 302 according to one or more embodiments. As described herein, the beat frequency of the combined light 346 is equal to a difference between the resonant frequencies of the first output light 340 and the second output light 342. Referring to FIG. 5, the beat frequency curve 602 corresponds to the differences between the trend lines 502 and 504 for the temperature range. The photodetector 348, for example, may output the electric signal 350 having a frequency response corresponding to the beat frequency curve 602 over a temperature range. The computer system 356 may store temperature correspondence data indicating a correspondence between the output 354 of the measurement device 352 and the temperature of the photonic device 302. The memory of the computer system 356 may, for example, store a lookup table or other data structure in which beat frequency values of the beat frequency curve 602 are associated with a corresponding temperature value. Alternatively, or in addition, the temperature correspondence data may include a function (i.e., formula or equation) that represents the beat frequency curve 602. The computer system 356 may provide an output (e.g., as data, on a display) based on the output 354 received using the temperature correspondence data stored in memory.

One or more sources of uncertainty for differential photonic resonance thermometry may exist in the framework described herein. Such sources potentially include laser locking frequency uncertainty and the frequency counter uncertainty. However, the level of uncertainty is significantly better and more stable over time relative to the uncertainty associated with other measurement systems, such as systems implementing the photonic device 102.

Figure 7:
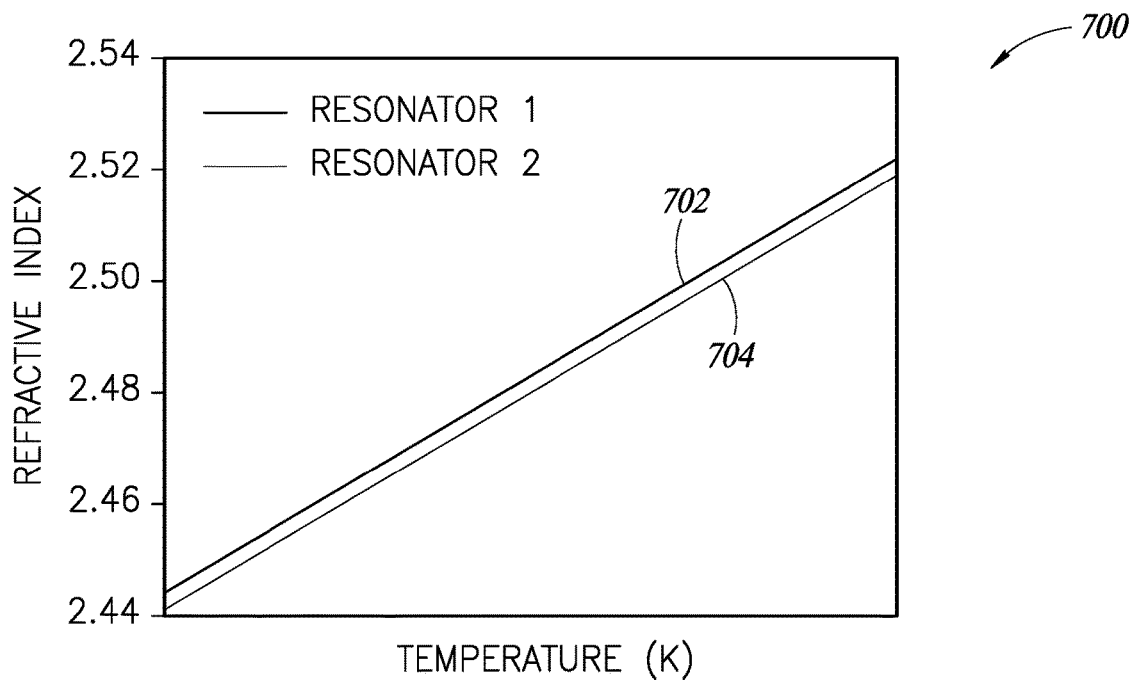
FIG. 7 is a graph showing a variation of refractive index of the first optical resonator and the second optical resonator of the first photonic device of FIG. 3 relative to temperature.

FIG. 7 shows a graph 700 depicting a variation of refractive index of the first optical resonator 306 and the second optical resonator 312 relative to temperature. The graph 700 shows a first refractive index 702 of the first optical resonator 306 relative to a temperature range. The graph 700 also shows a second refractive index 704 of the second optical resonator 312 relative to the temperature range. As shown, the effective refractive index of the first and second optical resonators 306 and 312 changes due to changes in temperature experienced by the photonic device 302. In this example, the first and second refractive indexes 702 and 704 have a same slope and may drift over time at a same rate.

Figure 8:
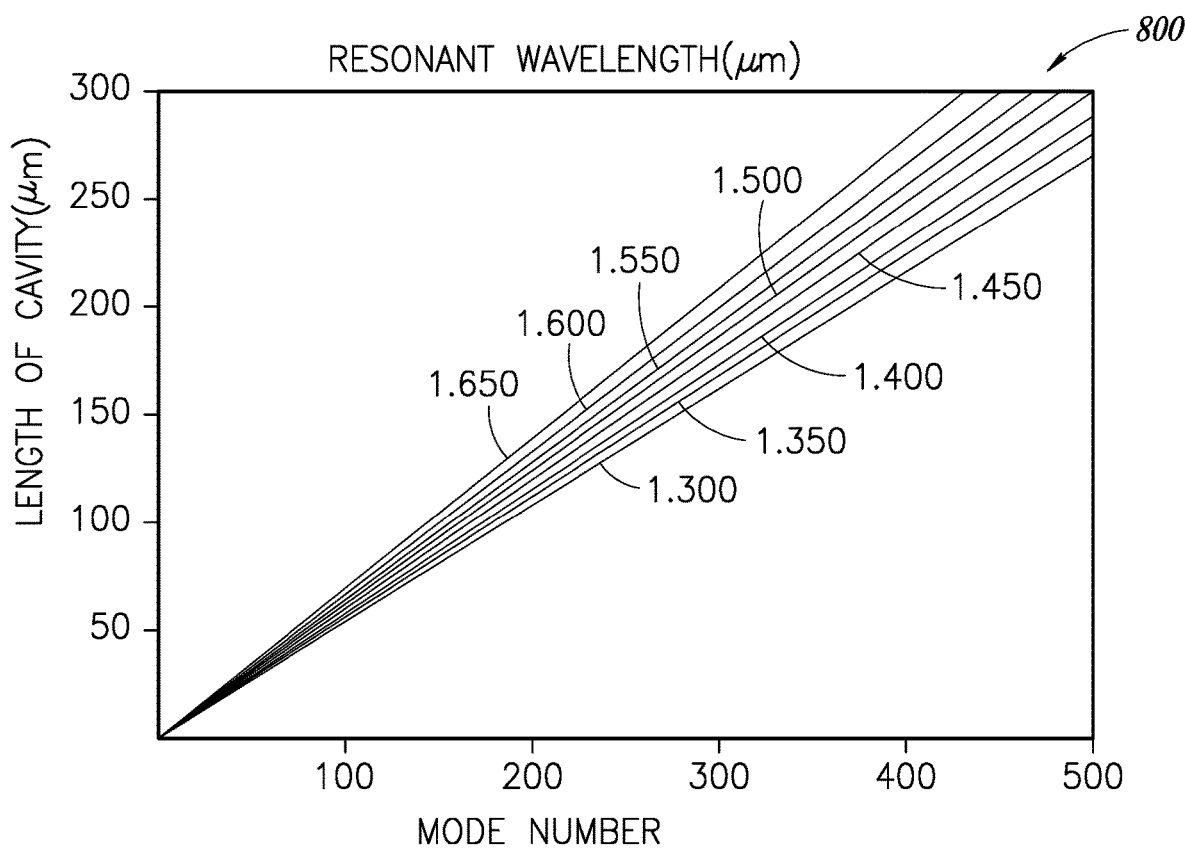
FIG. 8 is a diagram depicting variation of resonant wavelength of an optical resonator relative to mode number and optical path length of a cavity in the optical resonator.

FIG. 8 shows a diagram 800 depicting variation of resonant wavelength A relative to mode number m and optical path length l of an optical resonator described herein. There may be a plurality of resonant wavelengths λ of an optical resonator (e.g., from 1300 nm to 1650 nm) represented by lines of the diagram 800. Therefore, different resonant light wavelengths $\lambda_i$ may be output from an optical resonator based on a combination of optical path length $l_i$ and optical mode number $m_i$. Other considerations described herein are also involved in the resonant wavelength λ of light output by the optical resonators herein.

Figure 9:
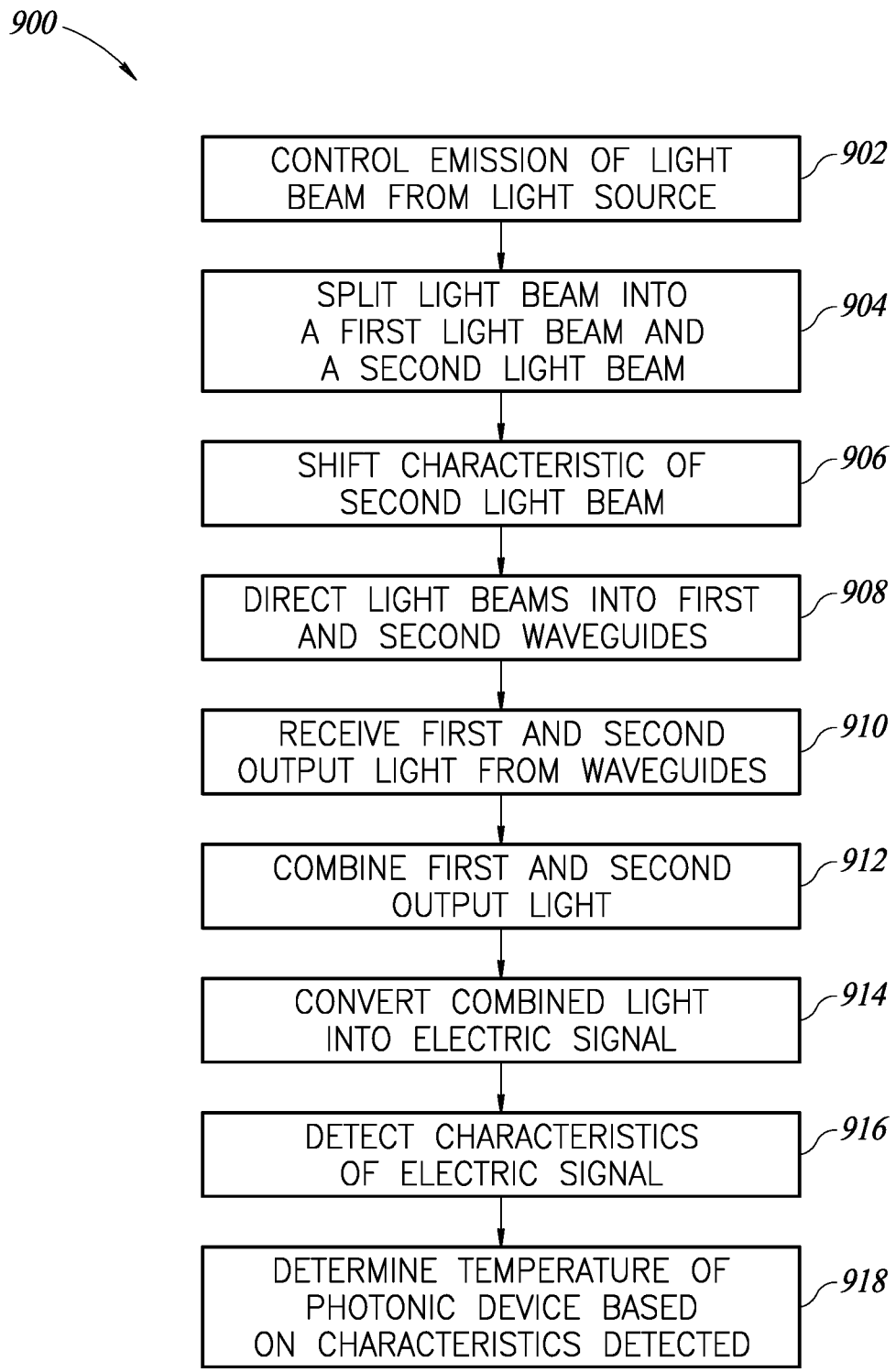
FIG. 9 is a flow chart illustrating a method of determining a temperature of the photonic thermometer of FIG. 3.

FIG. 9 shows a method 900 of operating a measurement system including a photonic device (in this case, a photonic thermometer) with two or more optical resonators having different resonant frequency responses, such as the measurement system 300, according to one or more embodiments of the present disclosure. The method 900 includes controlling 902 the light source 328 to emit the light 326. Controlling 902 may include controlling the light source 328 to emit light having a certain frequency and flux. In some embodiments, controlling 902 may include adjusting a characteristic of the light 326 from a first value to a second value over a period of time. For instance, the light source 328 may be controlled to emit the light 326 having a first frequency $f_1$ at a first time, then the frequency of the light 326 is adjusted (e.g., increased, decreased) over a time period until the light 326 has a second frequency $f_2$ matching the resonant frequency of the first optical resonator 306. The resonant frequency of the first optical resonator 306 may be determined by detecting a change in amplitude of the first output light 340 or a change in amplitude of the electric signal 350. For instance, the amplitude of the first output light 340 or the electric signal 350 may change significantly (e.g., increase in amplitude, decrease in amplitude) when the frequency of the first input light 332 is adjusted to match the resonant frequency of the first optical resonator 306. The change in the frequency of the light 326 may a continuous change or a step-wise or incremental change.

The method 900 includes splitting 904 the light 326 into a first light beam, such as the auxiliary light 334, and a second light beam, such as the first input light 332. The first light beam and the second light beam have a same frequency and phase. Splitting 904 the light 326 includes introducing the light 326 into the optical element 330 or other such optical element.

The method 900 may include shifting 906 a characteristic of the second light beam. Shifting 906 includes introducing or directing the second light beam—the auxiliary light 334—into the optical shifter 336. In some embodiments, shifting 906 includes shifting the frequency of the second input light 338 relative to the first input light 332. Shifting 906 may also include adjusting a frequency of the second input light 338 using an optical frequency locked loop relative to a frequency of the first input light 332.

Shifting 906, in some embodiments, is performed as a result of determining that the frequency of the first input light 332 is locked to a resonant frequency of the first optical resonator 306. The optical shifter 336 may be selectively controlled to shift the frequency of the second input light 338 relative to the first input light 332 until the frequency of the second input light 338 matches the resonant frequency of the second optical resonator 312. The resonant frequency of the second optical resonator 312 may be determined by detecting a change in amplitude of the second output light 342 or a change in amplitude of the electric signal 350. For instance, the amplitude of the second output light 342 or the electric signal 350 may change significantly (e.g., increase in amplitude, decrease in amplitude) when the frequency of the second input light 338 is adjusted to match the resonant frequency of the second optical resonator 312.

In some embodiments, the optical shifter 336 is configured to shift the frequency of the second input light 338 by a fixed amount. As a result of shifting 906 the second light beam, second input light 338 is obtained from the output of the optical shifter 336 in which the characteristic of the second input light 338 is different than the characteristic of the second light beam (i.e., the auxiliary light 334). In some embodiments, the method 900 may include controlling a second light beam generated by a second light source, as described earlier herein. In particular, the method 900 may include controlling the second light source to emit light having a frequency that is locked to a resonant frequency of the second optical resonator 312. In such embodiments, other operations of the method 900 may be omitted or adapted as appropriate to accommodate the use of first and second light sources.

The method 900 further includes directing 908 the first input light 332 and the second input light 338 respectively into the first waveguide 304 and the second waveguide 310 of the substrate 308. The first output light 340 and the second output light 342 are then received 910 from the first waveguide 304 and second waveguide 310, respectively. Receiving 910 the first output light 340 and the second output light 342 may include detecting the amplitude of the first output light 340 or the second output light 342. For instance, in connection with adjusting the frequency of the first input light 332, the amplitude of the first output light 340 may be monitored to determine when the frequency of the first input light 332 matches the resonant frequency of the first optical resonator 306. As another example, in connection with adjusting the frequency of the second input light 338, the amplitude of the second output light 342 may be monitored to determine when the frequency of the second input light 338 matches the resonant frequency of the second optical resonator 312.

The method 900 includes optionally combining 912 the first and second output light 340 and 342 into the combined light 346. As described with respect to the measurement system 300, combining 912 the first and second output light 340 and 342 may include introducing or directing the first and second output light 340 and 342 into the optical combiner 344. The combined light 346 has a beat frequency $f_{beat}$ corresponding to a difference in frequency between the first and second output light 340 and 342. The method 900 also includes converting 914 the combined light 346 into the electric signal 350. Converting 914 the combined light 346 includes directing or introducing the combined light 346 on or into the photodetector 348.

The method 900 includes detecting 916 one or more characteristics of the electric signal 350 using the one or more measurement devices 352. The electric signal 350 may be monitored to determine when the frequency of the first input light 332 matches the resonant frequency of the first optical resonator 306 or when the frequency of the second input light 338 matches the resonant frequency of the second optical resonator 312. For example, in connection with adjusting the frequencies of the first and second input light 332 and 338, the amplitude of the electric signal 350 is monitored and the frequencies of the first input light 332 and the second input light 338 may be respectively locked to the resonant frequencies of the first and second optical resonators 306 and 312 in response to a change in amplitude of the electric signal 350.

Detecting in 916 may include obtaining the frequency of the electric signal 350 subsequent to determining that the frequencies of the first and second input light 332 and 338 are respectively locked to the resonant frequencies of the first and second optical resonators 306 and 312. A corresponding beat frequency $f_{beat}$ of the combined light 346 may be determined based on the frequency of the electric signal 350. In some implementations, the beat frequency $f_{beat}$ and the frequency of the electric signal 350 may be the same. In some implementations, there may be a defined relationship between the beat frequency $f_{beat}$ and the frequency of the electric signal 350, such as a defined ratio between the frequencies.

The method 900 further includes determining 918 a temperature of the photonic device based on the characteristics detected 916 of the electric signal 350. As described with respect to FIG. 6, the beat frequency $f_{beat}$ is indicative of a particular temperature of the photonic device 302. Determining 918 the temperature therefore involves determining the temperature that corresponds to the detected beat frequency $f_{beat}$. This may include accessing a data structure in which beat frequency values of the beat frequency curve 602 are associated with a corresponding temperature value, e.g., using the computer system 356. Data or a visual indication may be outputted or presented to a user (e.g., on a display, over a network) indicating the temperature determined in 918.

The computer system 356 may be configured to automatically perform one or more operations of the method 900. In some embodiments, the computer system 356 may be operatively coupled to the light source 328, for example, via a set of control lines 358. The computer system 356 may be configured to control one or more optical characteristics (e.g., frequency, amplitude) of the light 326. In some embodiments, the computer system 356 may be operatively coupled to the optical shifter 336 and configured to control one or more optical characteristics (e.g., frequency, amplitude) of the second input light 338. The measurement system 300 in such embodiments may include a feedback loop in which computer system 356 locks the frequencies of the first and second input light 332 and 338 to the resonant frequencies of the first and second optical resonators 306 and 312 based on characteristics detected in the electric signal 350.

The computer system 356, for instance, may lock a frequency of the first input light 332 or a frequency of the second input light 338 in response to detecting a change in amplitude of the electric signal 350.

Figure 10:
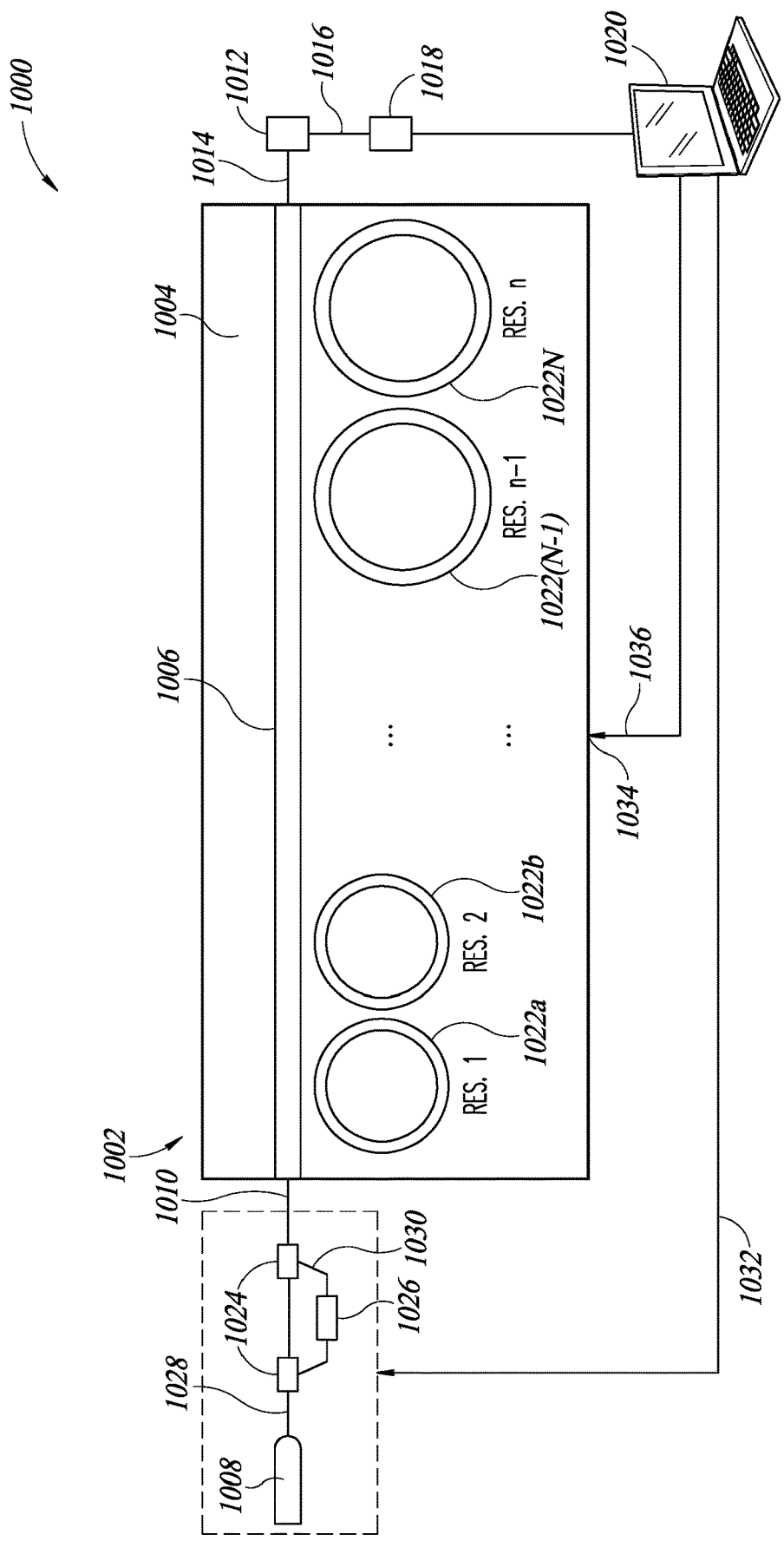
FIG. 10 is another schematic block diagram of a temperature measurement system that includes a photonic thermometer according to one or more embodiments of the present disclosure.

FIG. 10 illustrates a measurement system 1000 that includes a photonic device 1002 according to one or more embodiments. The photonic device 1002 includes a substrate 1004, a waveguide 1006, and a plurality of optical resonators 1022a, 1022b, . . . 1022N. The measurement system 1000 includes a light source 1008 configured to generate light 1010. The measurement system 1000 also includes a photodetector 1012 configured to convert output light 1014 that is output from the waveguide 1006 into an electric signal 1016, one or more measurement devices 1018 configured to detect one or more characteristics of the electric signal 1016, and a computer system 1020 configured to determine a temperature of the photonic device 1002 based on the characteristics of the electric signal 1016. The one or more measurement devices 1018 may include, for example, a frequency counter configured to detect a frequency of the electric signal 1016.

The plurality of optical resonators of the photonic device 1002 include a plurality of optical resonators 1022a, 1022b, . . . 1022N positioned adjacent to the waveguide 1006. The plurality of optical resonators 1022a, 1022b, . . . 1022N each have a different resonant frequency response to light relative to temperature, as described with respect to FIG. 3 and elsewhere herein. The plurality of optical resonators 1022a, 1022b, . . . 1022N are configured such that each optical resonator has a different resonant frequency response than one or more of the other optical resonators 1022a, 1022b, . . . 1022N or the remainder of the optical resonators, 1022a, 1022b, . . . 1022N. The differences in the resonant frequency responses may be a result of differences in material composition, size, surrounding structure/stress, etc., as described with respect to the first and second optical resonators 306 and 312. In some embodiments, the plurality of optical resonators 1022a, 1022b, . . . 1022N include three or more optical resonators. In some embodiments, the plurality of optical resonators 1022a, 1022b, . . . 1022N are optically decoupled from each other such that light in one optical resonator is not coupled into another optical resonator, such as an adjacent optical resonator.

The system 1000 includes the plurality of optical resonators 1022a, 1022b, . . . 1022N to determine a temperature of the photonic device 1002. In some embodiments, the optical resonators 1022a, 1022b, . . . 1022N may be associated in pairs such that a first pair of the optical resonators, for instance the resonators 1022a and 1022b, are associated with a first temperature range, and another pair of resonators of the plurality of optical resonators 1022a, 1022b, . . . 1022N are associated with a second temperature range, and so on.

In some embodiments, the measurement system 1000 may include a plurality of optical switches 1024 and an optical shifter 1026 coupled to the light source 1008. The measurement system 1000 may include a beam combiner and a beam splitter. The light source 1008 is controllable to emit light having a selected frequency. The plurality of optical switches are operable to optically couple the light source 1008 to the waveguide 1006, optically couple the light source 1008 to the optical shifter 1026, optically couple the optical shifter 1026 to the waveguide 1006, or combinations of the foregoing. The optical switches 1024 may be controllable to optically couple the beam combiner to the waveguide 1006 to combine light from the light source 1008 and the optical shifter 1026. The optical switches 1024 may be controllable to split first light 1028 from the light source 1008 into two beams.

In a first operating mode, the optical switches 1024 may be controlled to optically couple the light source 1008 to the waveguide 1006 and optically decouple the optical shifter 1026 from the waveguide 1006, such that the input light 1010 entering the waveguide 1006 is first light 1028 emitted from the light source 1008. In a second operating mode, the optical switches 1024 may be controlled to optically decouple the light source 1008 from the waveguide 1006, optically couple the light source 1008 to the optical shifter 1026, and optically couple the optical shifter 1026 to the waveguide 1006. In the second operating mode, the input light 1010 entering the waveguide 1006 is second light 1030 from the optical shifter 1026. In a third operating mode, the optical switches 1024 may be controlled to optically couple the light source 1008 to the beam splitter and split the first light 1028 into two beams, with one beam directed to the optical shifter 1026 and the other beam directed to the beam combiner. The optical switches 1024, in the third operating mode, are also controlled to optically couple the second light 1030 from the optical shifter 1026 into the beam combiner. The first light 1028 and the second light 1030 are thus combined as the input light 1010 entering the waveguide 1006 in the third operating mode. The measurement system 1000 may include an optical frequency locked loop that controls or locks the frequency of the second light 1030 relative to the frequency of the first light 1028.

To determine a temperature of the photonic device 1002, the optical switches 1024 are controlled at a first time to operate the measurement system 1000 in the first operating mode. In the first operating mode, a frequency of the light source 1008 is controlled to emit light having a first frequency $f_1$ corresponding to a resonant frequency of a first optical resonator of the plurality of optical resonators 1022a, 1022b, . . . 1022N. The optical switches 1024 are controlled at a second time to operate the measurement system 1000 in the second operating mode. In the second operating mode, the light source 1008 is controlled to emit light having the first frequency $f_1$ and the optical shifter 1026 is controlled to produce light having a second frequency $f_2$ corresponding to a resonant frequency of a second optical resonator of the plurality of optical resonators 1022a, 1022b, . . . 1022N. The resonant frequencies of individual optical resonators of the plurality of optical resonators 1022a, 1022b, . . . 1022N may be determined as described with respect to the method 900, the measurement system 300, and elsewhere herein.

Then, at a third time, the optical switches 1024 are controlled to operate the measurement system 1000 in the third operating mode. In the third operating mode, the light source 1008 is controlled to emit first light 1028 having the first frequency $f_1$ and the optical shifter 1026 is controlled to produce light (in phase with the first light 1028) having the second frequency $f_2$. The output light 1014 exiting the waveguide 1006 is directed on or into the photodetector 1012. The output light 1014 has a beat frequency $f_{beat}$ corresponding to the difference between first and second resonant frequencies $f_{R1}$ and $f_{R2}$ of the optical resonators. Although the input light 1010 may not be resonated in any of the plurality of optical resonators 1022a, 1022b, . . . 1022N due to the superposition of the first and second frequencies $f_1$ and $f_2$, the output light 1014 still has a beat frequency $f_{beat}$ equal to the difference between the first and second resonant frequencies $f_{R1}$ and $f_{R2}$. The one or more measurement devices 1018 detect the beat frequency $f_{beat}$ of the output light 1014 based on the electric signal 1016. A temperature of the photonic device 1002 may then be determined based on the beat frequency $f_{beat}$ as described with respect to FIGS. 3, 5, 9, and elsewhere herein.

The computer system 1020 may be operatively coupled to the light source 1008 and the optical shifter 1026 via control signals over a first connection 1032. The computer system 1020 may be configured to control optical characteristics of the light 1028 and 1030 emitted from the light source 1008 and the optical shifter 1026, via the first connection 1032. The computer system 1020 may be operatively coupled to the plurality of optical switches via control signals over the first connection 1032 and configured to control switching of individual optical switches of the plurality of optical switches. The computer system 1020 may be configured to receive measurements from the one or more measurement devices 1018. The computer system 1020, in some embodiments, is configured to perform one or more of the features described herein, such as by selectively controlling operation of the light source 1008 and the optical shifter 1026 to determine resonant frequencies of the plurality of optical resonators 1022a, 1022b, . . . 1022N.

In some embodiments, the photonic device 1002 may include a plurality of optical switches (not shown) that are operable to couple individual optical resonators of the plurality of optical resonators 1022a, 1022b, . . . 1022N to the waveguide 1006. The photonic device 1002 may include one or more terminals 1034 for receiving control signals to control the switching state of individual optical switches of the plurality of optical switches in the photonic device 1002. In some embodiments, the plurality of optical switches may be controlled to optically couple groups of the plurality of optical resonators 1022a, 1022b, . . . 1022N to the waveguide 1006. For instance, a single pair of optical resonators of the plurality of optical resonators 1022a, 1022b, . . . 1022N may be optically coupled to the waveguide 1006 and the remaining optical resonators of the plurality of optical resonators 1022a, 1022b, . . . 1022N may be optically decoupled from the waveguide 1006. The frequency of the input light 1010 may be controlled to the resonant frequencies of the coupled pair of optical resonators and the beat frequency $f_{beat}$ of the output light 1014 may be determined, as described herein. The computer system 1020 may be coupled to the one or more terminals 1034 via a second connection 1036 to control switching states of the plurality of optical switches of the photonic device 1002.

In some embodiments, the measurement system 1000 may include a plurality of the light sources 1008 that are individually controllable to generate frequencies corresponding to resonant frequencies of the plurality of optical resonators 1022a, 1022b, . . . 1022N. The plurality of optical switches 1024, in such embodiments, may be controllable to selectively couple and decouple one or more of the plurality of light sources 1008 from the waveguide.

In some embodiments, the photonic device 1002 may include one or more multimode optical resonators that have two or more resonant frequency responses to light. For instance, the multimode optical resonator may, at a given temperature, resonate light at a first frequency and resonate light at a second frequency. Examples of such multimode optical resonators are described elsewhere herein.

Figure 11:
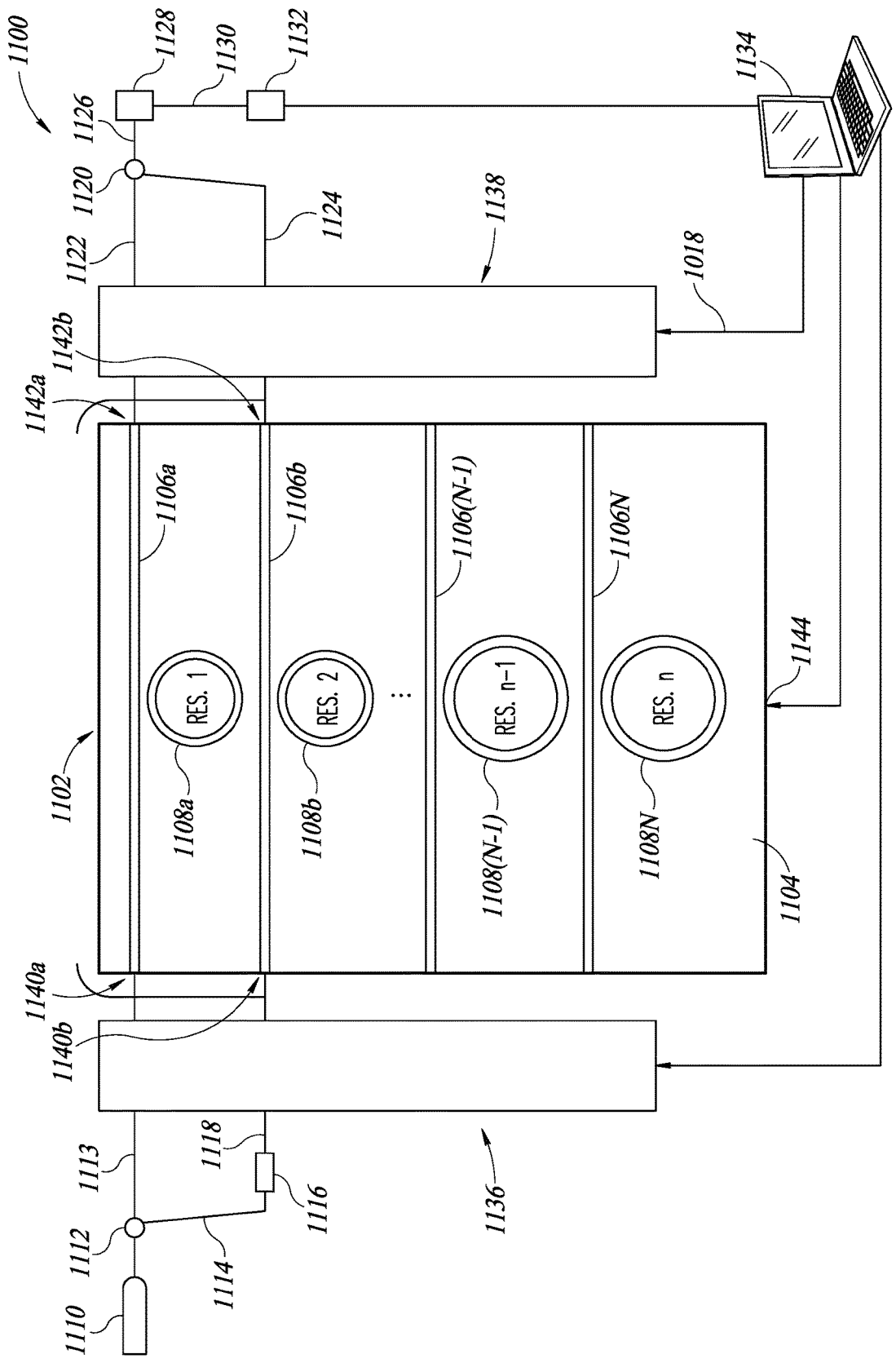
FIG. 11 is another schematic block diagram of a measurement system that includes a photonic device according to one or more embodiments of the present disclosure.

FIG. 11 shows a measurement system 1100 that includes a photonic device 1102 and, in this example, is configured to detect a temperature of the photonic device 1102. Various aspects of the measurement system 1100 are substantially similar to corresponding features described with respect to the measurement system 300, the method 900, and elsewhere herein, so further description thereof is omitted for brevity. The measurement system 1100 includes a substrate 1104, a plurality of waveguides 1106a, 1106b, . . . 1106N, and a plurality of optical resonators 1108a, 1108b, . . . 1108N. Each of the plurality of waveguides 1106a, 1106b, . . . 1106N is optically coupled to one of the plurality of optical resonators 1108a, 1108b, . . . 1108N. The measurement system 1100 includes a light source 1110 configured to generate light and an optical beam splitter 1112 configured to split the light from the light source 1110 into first input light 1113 and auxiliary light 1114. The measurement system 1100 includes an optical shifter 1116 that shifts an optical characteristic of the auxiliary light 1114 to generate second input light 1118.

The measurement system 1100 also includes a beam combiner 1120 configured to combine first output light 1122 and second output light 1124 into combined light 1126. A photodetector 1128 receives the combined light 1126 and converts the combined light 1126 into an electric signal 1130. The electric signal 1130 is received by one or more measurement devices 1132 and a temperature of the photonic device 1102 is determined based on one or more characteristics of the electric signal 1130. The measurement system 1100 may include a computer system 1134, which may determine the temperature of the photonic device 1102 and may control aspects of the measurement system 1100, as described herein.

The plurality of optical resonators 1108a, 1108b, . . . 1108N includes pairs of optical resonators that may be used to measure temperature in certain conditions. Pairs of optical resonators may be allocated for measuring the temperature in certain temperature ranges in some embodiments. For instance, a first pair of optical resonators 1108a and 1108b may be allocated for measuring in a first temperature range, a second pair of optical resonators 1108c and 1108d (not shown) may be allocated for measuring in a second temperature range different than the first temperature range, and so on.

The measurement system 1100 may include a first plurality of optical switches 1136 that are controllable to optically couple the first input light 1113 and the second input light 1118 to a pair of waveguides of the plurality of waveguides 1106a, 1106b, . . . 1106N. For example, for a first temperature range, one or more switches of the first plurality of optical switches 1136 couple the first input light 1113 into the waveguide 1106a and couple the second input light 1118 into the waveguide 1106b. For a second temperature range, one or more switches of the first plurality of optical switches 1136 couples the first input light 1113 into the waveguide 1106c (not shown) and couples the second input light 1118 into the waveguide 1106d (not shown).

The measurement system 1100 may include a second plurality of optical switches 1138 that are controllable to optically couple the first output light 1122 and the second input light 1124 from a pair of waveguides of the plurality of waveguides 1106a, 1106b, . . . 1106N to the beam combiner 1120. For example, for the first temperature range, one or more switches of the second plurality of optical switches 1138 couple the first output light 1122 from the waveguide 1106a and the second output light 1124 from the waveguide 1106b to the beam combiner 1120. For a second temperature range, one or more switches of the second plurality of optical switches 1138 couple the first output light 1122 from the waveguide 1106c (not shown) and the second output light 1124 from the waveguide 1106d (not shown) to the beam combiner 1120.

The first plurality of switches 1136 and the second plurality of switches 1138 are shown as being external to the photonic device 1102. In some embodiments however, the first plurality of switches 1136 and the second plurality of switches 1138 may be included in the photonic device 1102. In such embodiments, a first switch of the first plurality of switches 1136 may be coupled to an input port 1140*a* of the photonic device 1102 to receive the first input light 1113 and a second switch of the first plurality of switches 1136 may be coupled to an input port 1140*b* to receive the second input light 1118. The first and second switches of the plurality of switches 1136 may be controllable to optically couple the input ports 1140*a* and 1140*b* to a corresponding pair of the plurality of waveguides 1106*a*, 1106*b*, . . . 1106N. Also in such embodiments, a first switch of the second plurality of switches 1138 may be coupled to an output port 1142*a* of the photonic device 1102 to output the first output light 1122 and a second switch of the second plurality of switches 1138 may be coupled to an output port 1142*b* to output the second output light 1124. The first and second switches of the second plurality of switches 1138 in the photonic device 1102 may be controllable to optically couple the corresponding pair of the plurality of waveguides 1106*a*, 1106*b*, . . . 1106N to the output ports 1142*a* and 1142*b*.

The computer system 1134 may be coupled to control a switching state of the first plurality of optical switches 1136 and the second plurality of switches 1138. In embodiments wherein the substrate 1104 includes the first and second plurality of switches 1136 and 1138, the photonic device 1102 may include one or more terminals 1144 for receiving signals to control the first and second plurality of switches 1136 and 1138. The computer system 1134 may be communicatively coupled to the one or more terminals to control the switching state of the first and second plurality of switches 1136 and 1138.

Figure 12:
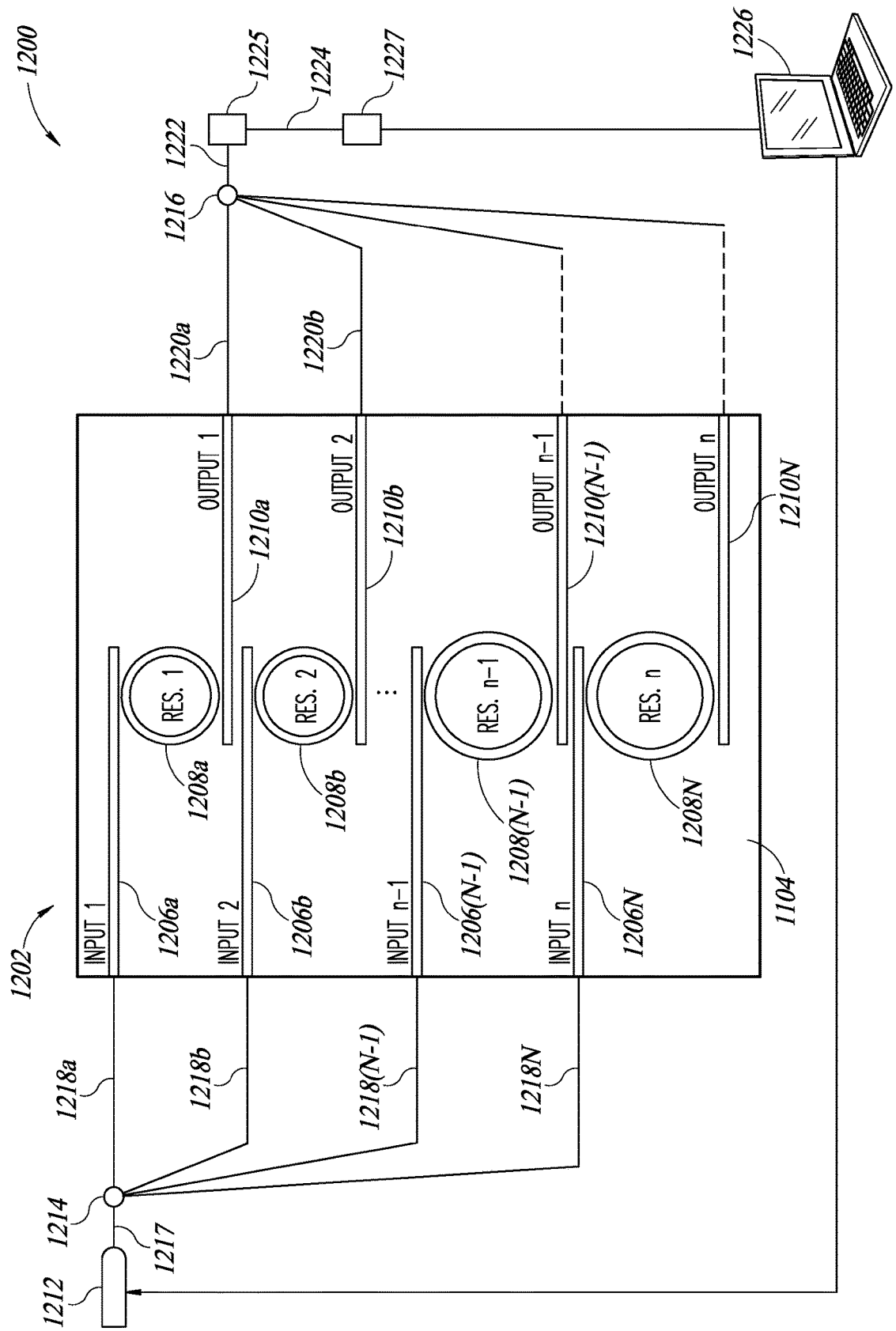
FIG. 12 is another schematic block diagram of a measurement system that includes a photonic device according to one or more embodiments of the present disclosure.

FIG. 12 shows a system 1200 that includes a photonic device 1202 and is configured to detect a temperature of the photonic device 1202. Various aspects of the measurement system 1200 are substantially similar to corresponding features described with respect to the measurement system 300, the measurement system 1100, the method 900, and elsewhere herein, so further description thereof is omitted for brevity. The measurement system 1200 includes a substrate 1204, a plurality of input waveguides 1206*a*, 1206*b*, . . . 1206N, a plurality of optical resonators 1208*a*, 1208*b*, . . . 1208N, a plurality of output waveguides 1210*a*, 1210*b*, . . . 1210N, a light source 1212, an optical beam splitter 1214, and an optical beam combiner 1216.

Each of the plurality of input waveguides 1206*a*, 1206*b*, . . . 1206N is optically coupled to a corresponding one of the plurality of optical resonators 1208*a*, 1208*b*, . . . 1208N. The plurality of output waveguides 1210*a*, 1210*b*, . . . 1210N are each optically coupled to a corresponding one of the plurality of optical resonators 1208*a*, 1208*b*, . . . 1208N. The plurality of input waveguides 1206*a*, 1206*b*, . . . 1206N are optically decoupled from corresponding output waveguides of the plurality of output waveguides 1210*a*, 1210*b*, . . . 1210N. For example, the input waveguide 1206*a* is optically decoupled from the output waveguide 1210*a* such that the output waveguide 1210*a* does not receive input light 1218*a* directly from the input waveguide 1206*a*, the input waveguide 1206*b* is optically decoupled from the output waveguide 1210*b* such that the output waveguide 1210*b* does not receive input light 1218*b* directly from the input waveguide 1206*b*, and so on.

The measurement system 1200 includes a broadband light source 1212, in this example, configured to emit input light 1217 having a light spectrum S having a spectral range between a first frequency and a second frequency. The input light 1217 is directed or introduced to an optical beam splitter 1214 that splits the input light 1217 into beams of input light 1218*a*, 1218*b*, . . . 1218N. The beams of input light 1218*a*, 1218*b*, . . . 1218N are directed or introduced into corresponding input waveguides of the plurality of input waveguides 1206*a*, 1206*b*, . . . 1206N.

The plurality of optical resonators 1208*a*, 1208*b*, . . . 1208N are respectively configured to resonate light that has a frequency corresponding to the resonant frequency of the respective optical resonator. Each resonator of the plurality of optical resonators 1208*a*, 1208*b*, . . . 1208N has a different resonant frequency response based on differences between the resonators, e.g., as described with respect to FIG. 3, FIG. 4, and elsewhere herein. As a result of the resonant frequency of one or more optical resonators of the plurality of optical resonators 1208*a*, 1208*b*, . . . 1208N corresponding to a frequency included in the light spectrum S, the light having the corresponding frequency will be resonated in the one or more optical resonators from the corresponding waveguides of the plurality of input waveguides 1206*a*, 1206*b*, . . . 1206N. The resonated light in the one or more respective optical resonators is coupled to a corresponding output waveguide of the plurality of output waveguides 1210*a*, 1210*b*, . . . 1210N and output from the photonic device 1202.

For instance, if the spectrum S includes a frequency $f_1$ corresponding to the resonant frequency $f_{R1}$ of the optical resonator 1208*a*, input light 1218*a* having the corresponding frequency $f_1$ is coupled into the optical resonator 1208*a* and resonated therein. The resonated light 1220*a* is coupled from the optical resonator 1208*a* into the output waveguide 1210*a* and output from the output waveguide 1210*a*. As another example, if the spectrum S includes a frequency $f_2$ corresponding to the resonant frequency $f_{R2}$ of the optical resonator 1208*b*, input light 1218*b* having the corresponding frequency $f_2$ is coupled into the optical resonator 1208*b* and resonated therein. The resonated light 1220*b* is coupled from the optical resonator 1208*b* into the output waveguide 1210*b* and output from the output waveguide 1210*b*. The optical combiner 1216 combines the light 1220*a* and 1220*b* into combined light 1222, which is converted into an electric signal 1224 by a photodetector 1225 and the electric signal 1224 is analyzed by a measurement device 1227 to determine a beat frequency $f_{beat}$ of the combined light 1222, as described herein. The measurement system 1200 may include a computer system 1226 configured to control operation of the light source 1212, such as by controlling the frequency range of the spectrum S, and determine the temperature of the photonic device 1202 as described herein.

The spectrum S may exclude frequencies corresponding to resonant frequencies of other optical resonators of the plurality of optical resonators 1208*a*, 1208*b*, . . . 1208N. For instance, the input light 1217 may not include light having a frequency corresponding to a resonant frequency of the optical resonator 1208(N−1) or light having a frequency corresponding to a resonant frequency of the optical resonator 1208N. As a result, light is not coupled into or out from the corresponding output waveguides 1210(N−1) and 1210N. The light source 1212 may be controlled to include the resonant frequencies of a first set of the plurality of optical resonators 1208*a*, 1208*b*, . . . 1208N and exclude resonant frequencies of a second set of the plurality of optical resonators 1208*a*, 1208*b*, . . . 1208N. As a result, a set of optical resonators of the plurality of optical resonators 1208*a*, 1208*b*, . . . 1208N may be selected to be used to determine a temperature of the photonic device 1202 without using optical switches to couple the beams of input light

1218a, 1218b, ... 1218N into the plurality of input waveguides 1206a, 1206b, ... 1206N.

In some embodiments, the measurement system 1200 may include a plurality of optical switches that are controllable to selectively direct light into selected ones of the plurality of input waveguides 1206a, 1206b, ... 1206N or plurality of optical switches that are controllable to selectively direct light from selected ones of the plurality of output waveguides 1210a, 1210b, ... 1210N, as described with respect to the measurement system 1100. In such embodiments, the plurality of switches may be internal or external to the photonic device 1202.

Figure 13:
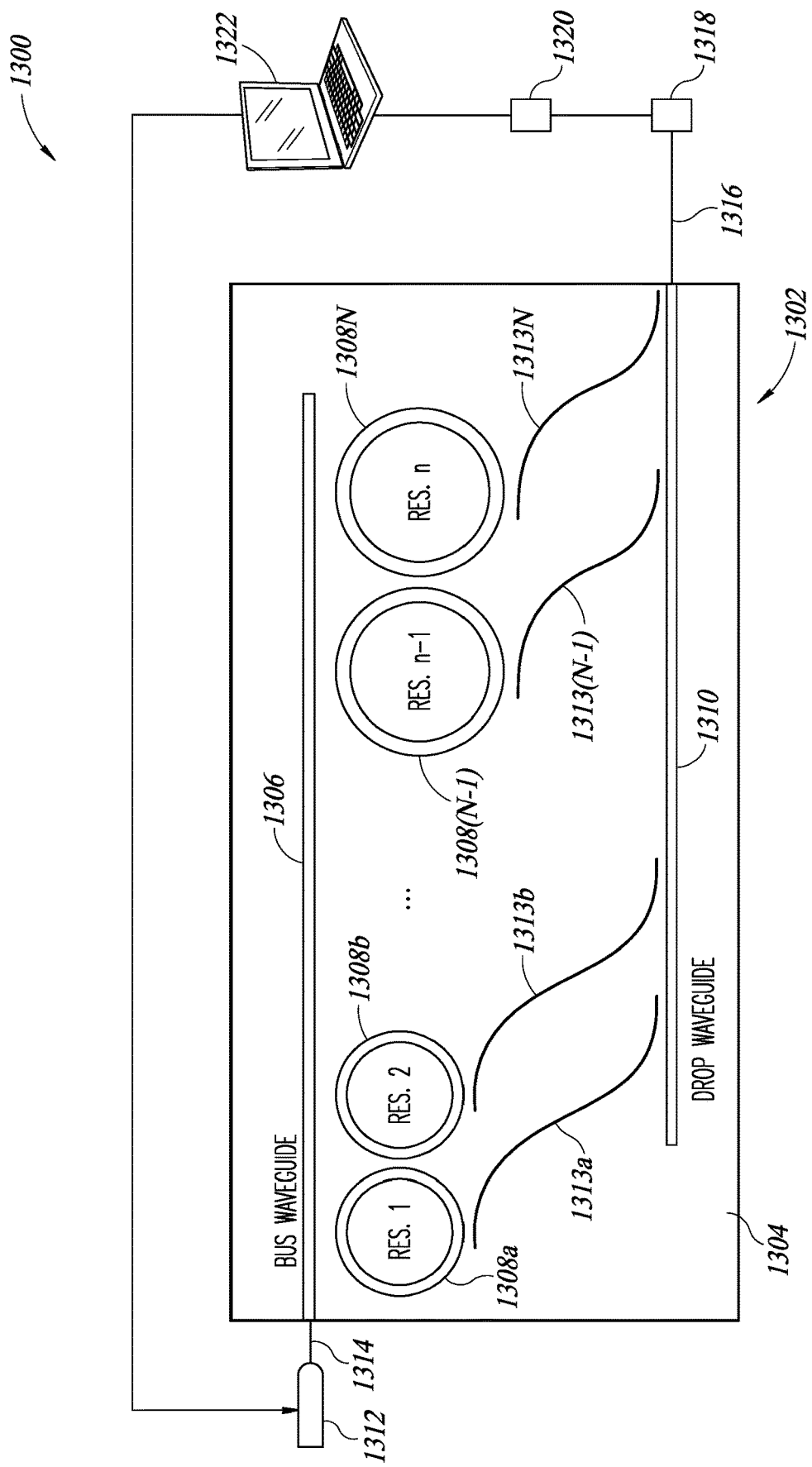
FIG. 13 is another schematic block diagram of a measurement system that includes a photonic device according to one or more embodiments of the present disclosure.

FIG. 13 shows a measurement system 1300 that includes a photonic device 1302 and is configured to detect a temperature of the photonic device 1302. Various aspects of the measurement system 1300 are substantially similar to corresponding features described with respect to the measurement system 300, the measurement system 1200, the method 900, and elsewhere herein, so further description thereof is omitted for brevity. The photonic device 1302 includes a substrate 1304, an input waveguide 1306, a plurality of optical resonators 1308a, 1308b, ... 1308N, an output waveguide 1310. The measurement system 1300, in this example, includes a broadband light source 1312 configured to generate input light 1314 having a light spectrum S having a spectral range between a first frequency and a second frequency.

The input waveguide 1306 is optically coupled to the plurality of optical resonators 1308a, 1308b, ... 1308N. The output waveguide 1310 is also optically coupled to the plurality of optical resonators 1308a, 1308b, ... 1308N. The input waveguide 1306 is spaced apart and optically decoupled from the output waveguide 1310 such that the output waveguide 1310 does not receive input light 1314 directly from the input waveguide 1306.

The plurality of optical resonators 1308a, 1308b, ... 1308N are respectively configured to resonate light that has a frequency corresponding to the resonant frequency of the respective optical resonator. Each resonator of the plurality of optical resonators 1308a, 1308b, ... 1308N has a different resonant frequency response based on differences between the resonators, e.g., as described with respect to FIG. 3, FIG. 4, and elsewhere herein. The resonant frequency $f_R$ of each of the plurality of optical resonators 1308a, 1308b, ... 1308N changes based on the temperature of the respective optical resonator due to differences between each of the plurality of optical resonators 1308a, 1308b, ... 1308N. As a result of the resonant frequency of one or more optical resonators of the plurality of optical resonators 1308a, 1308b, ... 1308N corresponding to a frequency included in the light spectrum S, the light having the corresponding frequency will be resonated in the one or more optical resonators from the input waveguide 1306. Resonant light 1313a, 1313b, ... , 1313N in the one or more respective optical resonators is coupled to the output waveguide 1310 and output from the photonic device 1302.

In some embodiments, the photonic device 1302 may include a plurality of optical switches that are controllable to selectively couple and decouple the input waveguide 1306 to and from the plurality of optical resonators 1308a, 1308b, ... 1308N. In such embodiments, the plurality of switches may be internal or external to the photonic device 1302. The plurality of optical switches may be internal to the photonic device 1302, which may include one or more terminals (not shown) for receiving control signals for controlling a switching state of the plurality of optical switches.

Output light 1316 that is output from the output waveguide 1310 includes resonant light 1313 from one or more of the plurality of optical resonators 1308a, 1308b, ... 1308N. For instance, if the spectrum S includes a frequency $f_1$ corresponding to the resonant frequency $f_{R1}$ of the optical resonator 1308a, light from the input light 1314 having the corresponding frequency $f_1$ is coupled into the optical resonator 1308a and resonated therein. The resonated light 1313a is coupled from the optical resonator 1308a into the output waveguide 1310 and output from the output waveguide 1310 in the output light 1316. If the spectrum S further includes a frequency $f_2$ corresponding to the resonant frequency $f_{R2}$ of the optical resonator 1308b, light from the input light 1314 having the corresponding frequency $f_2$ is coupled into the optical resonator 1308b and resonated therein. The resonated light 1313b is coupled from the optical resonator 1308b into the output waveguide 1310 along with the resonated light 1313a and output from the output waveguide 1310. The output light 1316, in such an instance, includes the resonated light 1313a and the resonated light 1313b in superposition with each other. As a result, the output light 1316 has a beat frequency $f_{beat}$ equal to the difference between the first and second resonant frequencies $f_{R1}$ and $f_{R2}$ of the optical resonators 1308a and 1308b, respectively. Using a photodetector 1318 and a measurement device 1320, e.g., as described with respect to the measurement system 300, the method 900, and elsewhere herein, the beat frequency $f_{beat}$ of the output light 1316 is detected and the temperature of the photonic device 1302 can be determined. The measurement system 1300 may include a computer system 1322 configured to control operation of various aspects of the measurement system 1300, such as by controlling the frequency range of the spectrum S of the input light 1314 emitted by the broadband light source 1312, or by determining the temperature of the photonic device 1302 based on the beat frequency $f_{beat}$.

In some embodiments, the photonic device 1302 may include one or more multimode optical resonators that have two or more resonant frequency responses to light for a given temperature. For instance, the multimode optical resonator may, at a given temperature, resonate light having a first frequency and resonate light having a second frequency, described by way of example herein.

Figure 14:
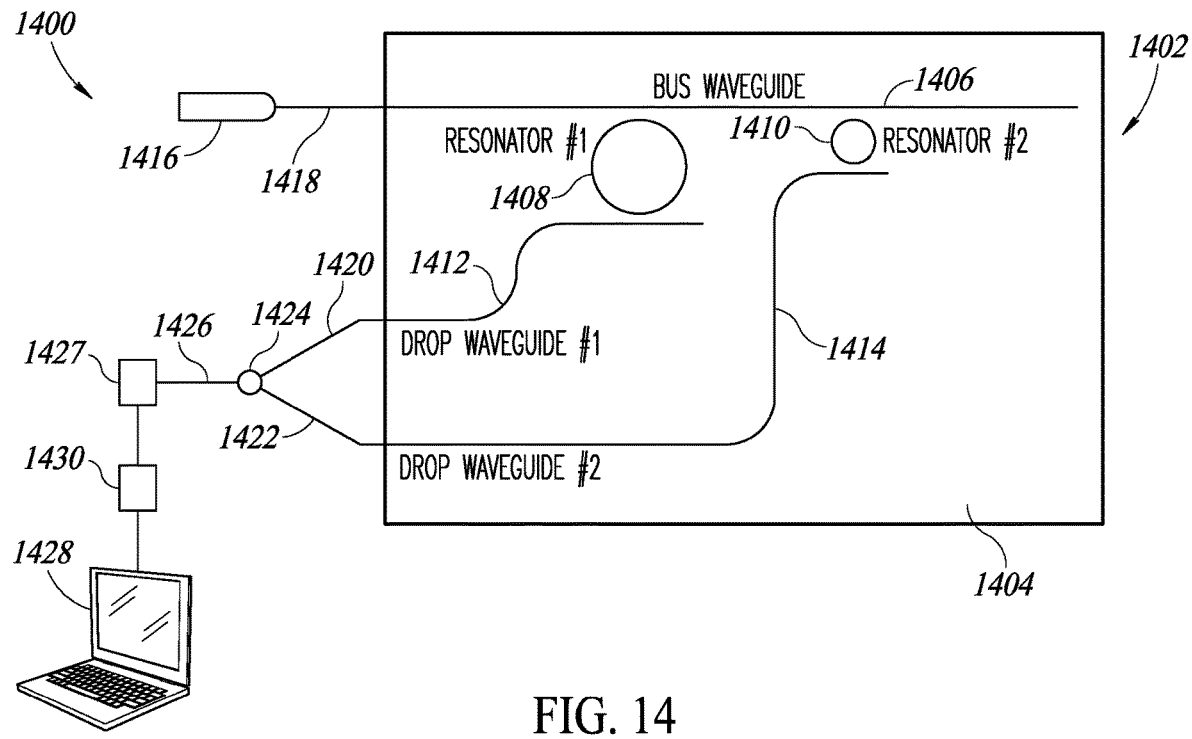
FIG. 14 is another schematic block diagram of a measurement system that includes a photonic device according to one or more embodiments of the present disclosure.

FIG. 14 shows a measurement system 1400 that includes a photonic device 1402 and is configured to detect a temperature of the photonic device 1402. Various aspects of the measurement system 1400 are substantially similar to corresponding features described with respect to the measurement system 300, the measurement system 1200, the method 900, and elsewhere herein, so further description thereof is omitted for brevity. The photonic device 1402 includes a substrate 1404, an input waveguide 1406, a first optical resonator 1408, a second optical resonator 1410, a first output waveguide 1412, a second output waveguide 1414. The measurement system 1400 also includes a broadband light source 1416, in this example, configured to generate input light 1418 having a broadband light spectrum S having a spectral range between a first frequency and a second frequency.

The input waveguide 1406 is optically coupled to the first optical resonator 1408 and the second optical resonator 1410. The first output waveguide 1412 is optically coupled to the first optical resonator 1408, and the second optical resonator 1410 is optically coupled to the second output waveguide 1414. The input waveguide 1406 is spaced apart and optically decoupled from the first and second output waveguides 1412 and 1414 such that the first and second output waveguides 1412 and 1414 do not receive the input light 1418 directly from the input waveguide 1406.

The first optical resonator 1408 is configured to resonate light that has a frequency $f_1$ corresponding to a resonant frequency $f_{R1}$ of the first optical resonator 1408. The second optical resonator 1410 is configured to resonate light that has a frequency $f_2$ corresponding to a resonant frequency $f_{R2}$ of the second optical resonator 1410. The resonant frequency $f_{R1}$ of the first optical resonator 1408 is different than the resonant frequency $f_{R2}$ of the second optical resonator 1410. Moreover, the first optical resonator 1408 has a different resonant frequency response than the second optical resonator 1410 due to differences between the resonators, as described with respect to FIG. 3, FIG. 4, and elsewhere herein. The resonant frequency $f_{R1}$ of the first optical resonator 1408 and the resonant frequency $f_{R2}$ of the second optical resonator 1410 changes based on the temperature of the respective optical resonator.

As a result of the resonant frequency of the first and second optical resonators 1408 and 1410 corresponding to a frequency included in the light spectrum S, the light having the corresponding frequency will be resonated in the first optical resonator 1408 and the second optical resonator 1410. Light of frequencies other than the resonant frequencies $f_{R1}$ and $f_{R2}$ is not resonated by the first and second optical resonators 1408 and 1410. Resonant light 1420 in the first optical resonator 1408 is coupled into and output from the first output waveguide 1412. Resonant light 1422 in the second optical resonator 1410 is coupled into and output from the second output waveguide 1414. The resonant light 1420 has a frequency corresponding to the frequency $f_1$ and the resonant light 1422 has a frequency corresponding to the frequency $f_2$. The resonant light 1420 and 1422 are directed or introduced into optical combiner 1424 and combined into combined light 1426 that is provided to a photodetector 1427. The combined light 1426 has a beat frequency $f_{beat}$ corresponding to the difference in frequency of the first and second resonant light 1420 and 1422, and this beat frequency $f_{beat}$ is detectable in an electric signal provided by the photodetector 1427 to a measurement device 1430. The measurement device 1430 may be, for example, an RF spectrum analyzer configured to measure magnitudes of the electric signal relative to frequency of the electric signal.

The measurement system 1400 may include a computer system 1428 configured to control operation of various aspects of the measurement system 1400, such as by controlling the frequency range of the spectrum S of the input light 1418 emitted by the broadband light source 1416, or by determining the temperature of the photonic device 1402 based on the beat frequency $f_{beat}$ detected by the measurement device 1430.

Figure 15:
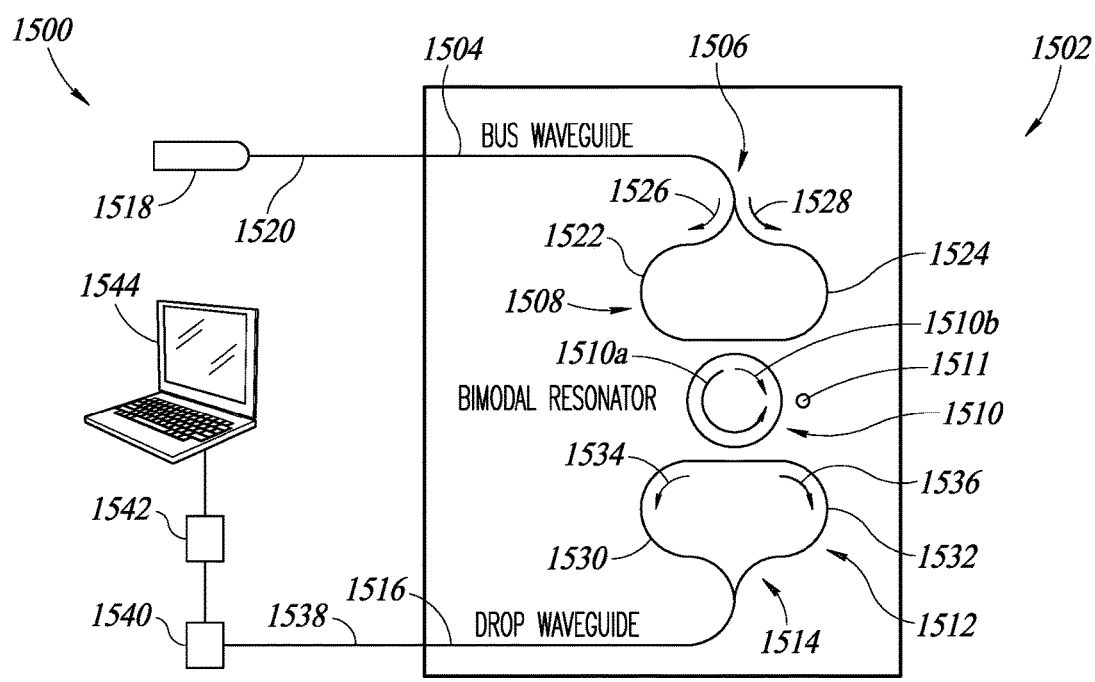
FIG. 15 is another schematic block diagram of a measurement system that includes a photonic device according to one or more embodiments of the present disclosure.

FIG. 15 shows a measurement system 1500 that includes a photonic device 1502 and is configured to detect a temperature of the photonic device 1502. Various aspects of the measurement system 1500 are substantially similar to corresponding features described with respect to the measurement system 300, the method 900, and elsewhere herein, so further description thereof is omitted for brevity. The photonic device 1502 includes an input waveguide 1504, a first waveguide junction 1506, a first waveguide loop 1508, an optical resonator 1510, a second waveguide loop 1512, a second waveguide junction 1514, and an output waveguide 1516. The measurement system 1500 also includes a light source 1518 configured to generate input light 1520 having a broadband light spectrum S, in this example, with a spectral range between a first frequency and a second frequency.

At the first waveguide junction 1506, the input waveguide 1504 splits into a first input waveguide portion 1522 and a second input waveguide portion 1524. The first waveguide loop 1508 is a continuous waveguide that includes the first input waveguide portion 1522 and the second input waveguide portion 1524. The input light 1520 enters the first waveguide 1504 and, at the first waveguide junction 1506, splits into a first light portion 1526 and a second light portion 1528. The first light portion 1526 and the second light portion 1528 have the same characteristics of the input light 1520. The input light 1520 is, in some embodiments, divided equally between the first light portion 1526 and the second light portion 1528.

The optical resonator 1510 is a bimodal optical resonator that includes a first resonator portion 1510a and a second resonator portion 1510b. The first resonator portion 1510a is a portion of the optical resonator 1510 that has a first resonant response relative to temperature. The second resonator portion 1510b is a different portion of the optical resonator 1510 that has a second resonant response relative to temperature, the second resonant response being different than the first resonant response. The first resonator portion 1510a may comprise a first semi-circle or half-disc of the optical resonator 1510 and the second resonator portion 1510b may comprise a second semicircle or half disc of the optical resonator 1510. The optical resonator 1510, in some embodiments, has a single, continuous resonant structure that includes the first and second resonator portions 1510a and 1510b. The differing resonant frequency responses of the first and second resonator portions 1510a and 1510b may be due to differences in size, shape, material composition, mechanical stress, additional or different features (e.g., additional cavity), or other differences described herein. Alternatively, or in addition, a feature 1511 positioned adjacent to the optical resonator 1510 operates to break the symmetry of the optical resonator 1510 and thereby cause the clockwise and counterclockwise resonator modes of the optical resonator 1510 (discussed below) to have different frequencies.

In operation, the first light portion 1526 of the input light 1520 circulates in a first direction through the first waveguide loop 1508 (e.g., clockwise) and the second light portion 1528 of the input light 1520 circulates in a second direction through the first waveguide loop 1508 opposite to the first direction (e.g., counterclockwise). As a result of the first light portion 1526 having a frequency $f_1$ corresponding to a resonant frequency $f_{R1}$ of the second resonator portion 1510b, the first light portion 1526 is coupled into and resonated within the second resonator portion 1510b. As a result of the second light portion 1528 having a frequency $f_2$ corresponding to a resonant frequency $f_{R2}$ of the first resonator portion 1510a, the second light portion 1528 is coupled into and resonated within the first resonator portion 1510a.

At the second waveguide junction 1514, the output waveguide 1516 splits into a first output waveguide portion 1530 and a second output waveguide portion 1532. The second waveguide loop 1512 is a continuous waveguide that includes the first output waveguide portion 1530 and the second output waveguide portion 1532. First resonant light 1534 resonated in the second resonator portion 1510b is coupled into the first output waveguide portion 1530 and travels through the second waveguide loop 1512 in the first direction (e.g., counterclockwise). Second resonant light 1536 resonated in the first resonator portion 1510a is coupled into the second output waveguide portion 1532 and travels through the second waveguide loop 1512 in the second direction opposite to the first direction (e.g., clockwise). The first resonant light 1534 and the second resonant light 1536 enter the second waveguide junction 1514 and combine to form output light 1538 that is output from the output waveguide 1516. The output light 1538 has a beat frequency $f_{beat}$ equal to the difference between the first resonant light 1534 and the second resonant light 1536. The beat frequency $f_{beat}$ of the output light 1538 is determined using a photodetector 1540 and a measurement device 1542 in a manner as described herein.

The measurement system 1500 may include a computer system 1544 configured to control operation of various aspects of the measurement system 1500, such as by controlling the frequency range of the spectrum S of the input light 1520 emitted by the light source 1518, or by determining the temperature of the photonic device 1502 based on the beat frequency $f_{beat}$.

Figure 16:
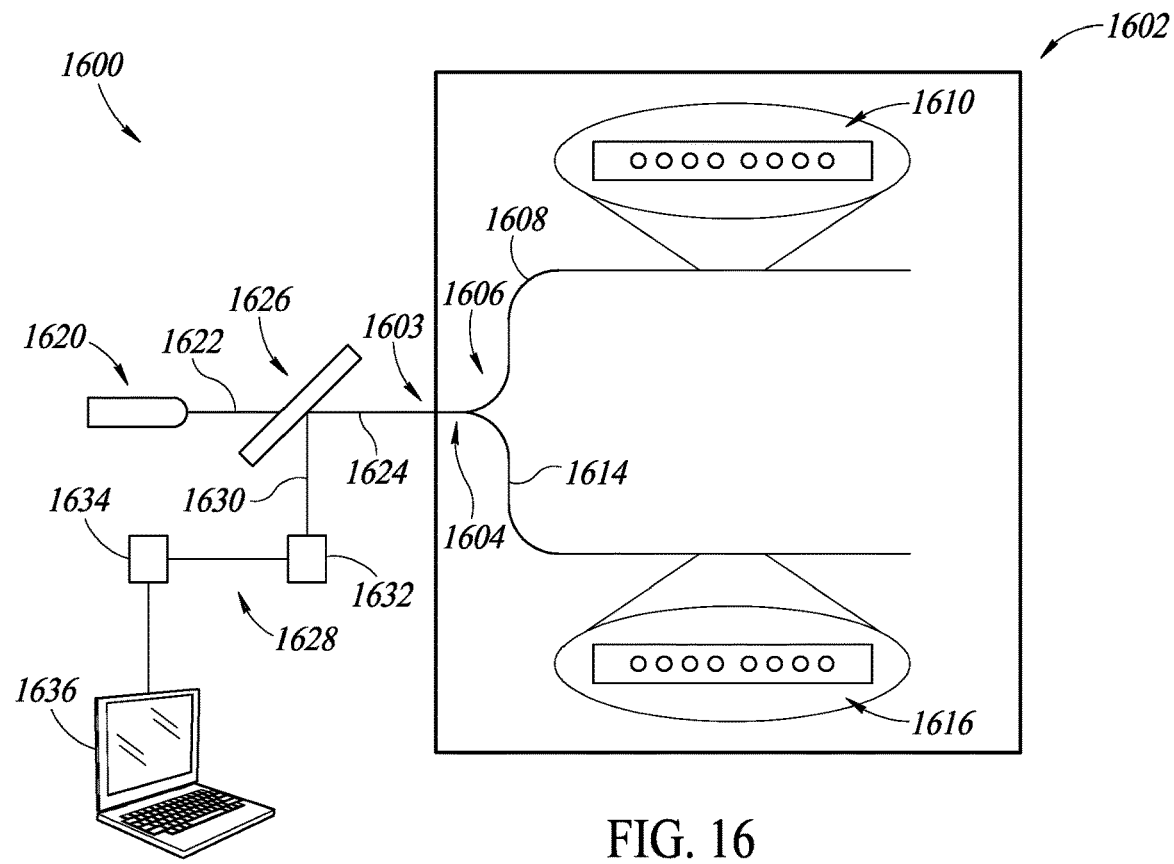
FIG. 16 is another schematic block diagram of a measurement system that includes a photonic device according to one or more embodiments of the present disclosure.

FIG. 16 shows a measurement system 1600 that includes a photonic device 1602. The measurement system 1600 is configured to detect a temperature of the photonic device 1602. Various aspects of the measurement system 1600 are substantially similar to corresponding features described with respect to the measurement system 300, the method 900, and elsewhere herein, so further description thereof is omitted for brevity. The photonic device 1602 includes a port 1603, a waveguide 1604, a waveguide junction 1606, a first waveguide 1608, a first optical resonator 1610 (enlargement shown), a second waveguide 1614, and a second optical resonator 1616 (enlargement shown). The measurement system 1600 also includes a light source 1620 configured to generate input light 1622 having a broadband light spectrum S, in this example, with a spectral range between a first frequency and a second frequency.

At the waveguide junction 1606, incoming light is split and directed into the first waveguide 1608 and the second waveguide 1614. The first optical resonator 1610 is positioned in an optical path of the first waveguide 1608 and the second optical resonator 1616 is positioned in an optical path of the second waveguide 1614. The first optical resonator 1610 has a different resonant frequency response than the second optical resonator 1616, as discussed herein. The first and second optical resonators 1610 and 1616 may be whispering gallery mode resonators, photonic crystal cavities, ring resonators, Bragg gratings, Fabry-Perot interferometers (e.g., etalons), disk resonators, or any other appropriate optical resonator. In some embodiments, the first optical resonator 1610 may be a different type of optical resonator than the second optical resonator 1616.

The input light 1622 enters the waveguide 1604 via the port 1603 and, at the waveguide junction 1606, is split into a first light portion that enters the first waveguide 1608 and a second light portion that enters the second waveguide 1614. The first optical resonator 1610 resonates the first light portion and the second optical resonator 1616 resonates the second light portion. The resonated first light portion returns through the waveguide 1604 and is output from the port 1603. The resonated second light portion returns through the waveguide 1604 with the resonated first light portion, and is output from the port 1603. Non-resonated light of the input light 1622 also returns back through the first and second waveguides 1608, 1614, and is output from the port 1603 in combination with the first and second resonated light portions.

Light 1624 that is output from the port 1603 may include resonated and non-resonated light. The measurement system 1600 may include an optical isolator 1626 that permits the input light 1622 to travel therethrough and which reflects the output light 1624. The measurement system 1600 includes one or more measurement devices 1628 positioned to receive reflected light 1630 from the optical isolator 1626. The one or more measurement devices 1628 include, at least in some embodiments, a spectral analyzer 1634 that analyzes the resonated and non-resonated light in the emitted light 1624 detected by a photodetector 1632 to detect the resonated frequencies induced by the first and second optical resonators 1610, 1616. The temperature of the photonic device 1602 may be determined, e.g., by computer system 1636, based on differences between the resonant frequencies, as discussed herein.

Figure 17:
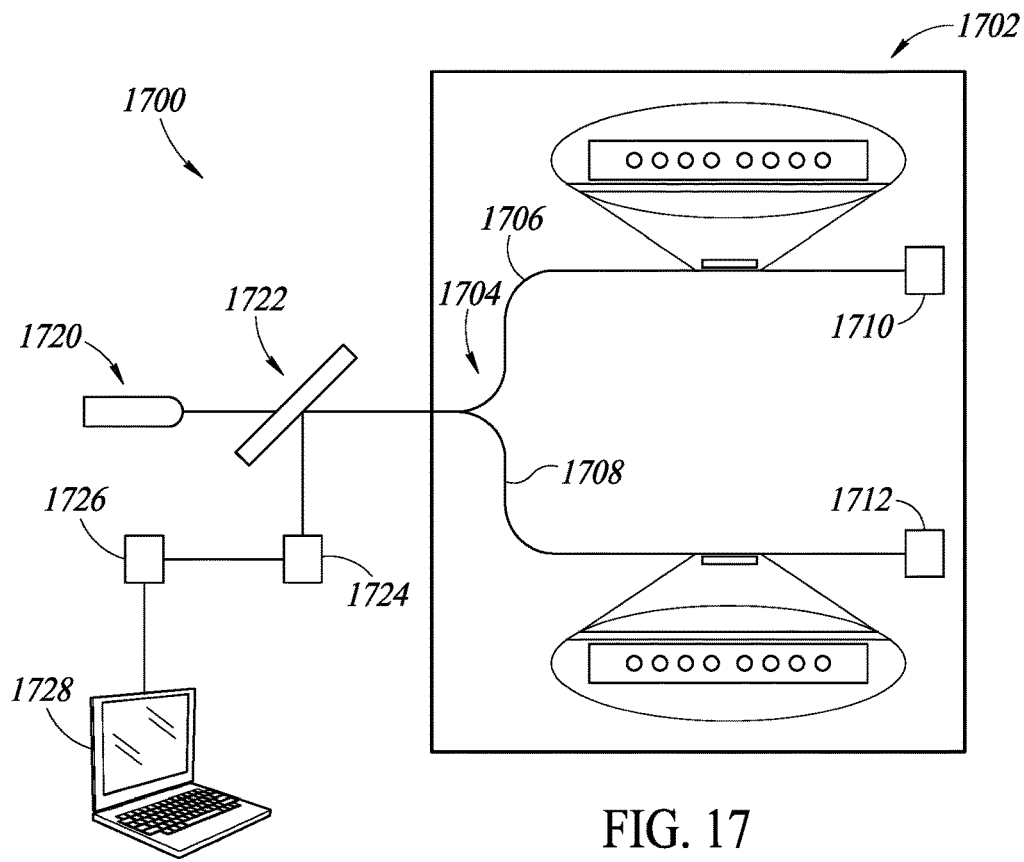
FIG. 17 is another schematic block diagram of a measurement system that includes a photonic device according to one or more embodiments of the present disclosure.

FIG. 17 shows a measurement system 1700 that includes a photonic device 1702 and is configured to detect a temperature of the photonic device 1702. Various aspects of the measurement system 1700, including a light source 1720, an optical isolator 1722, a photodetector 1724, and a measurement device 1726, operate substantially similar to corresponding features described with respect to the measurement system 1600, the method 900, and elsewhere herein, so further description thereof is omitted for brevity. The photonic device 1702 includes a waveguide junction 1704, a first waveguide 1706 with a first optical resonator adjacent thereto, and a second waveguide 1708 with a second optical resonator adjacent thereto. FIG. 17 shows enlarged views of the first and second optical resonators, which may include a photonics crystal or other type of optical resonator, adjacent to the first and second waveguides 1706, 1708, respectively.

The first waveguide 1706 includes an optically reflective end 1710 and the second waveguide 1708 includes an optically reflective end 1712. A first light portion in the first waveguide 1706 is reflected from the reflective end 1710 and a second light portion in the second waveguide 1708 is reflected from the reflective end 1712. The reflected first and second light portions, which include light resonated by the first and second optical resonators as well as unresonated light, return via the respective first and second waveguides 1706, 1708, and are then combined and measured to determine the temperature of the photonic device 1702, e.g., by the photodetector 1724, measurement device 1726, and computer system 1728 which determine a beat frequency in the returning light and correlate the determined beat frequency with temperature, in a manner as described with respect to the measurement system 1600 and other measurement systems described herein. As an alternative to reflective ends 1710, 1712, the first and second waveguides 1706, 1708 may each terminate with a waveguide loop around which the respective first and second light portions travel and return via the first and second waveguides 1706, 1708, to the waveguide junction 1704 and the optical isolator 1722 which directs the returning light to the photodetector 1724.

Figure 18:
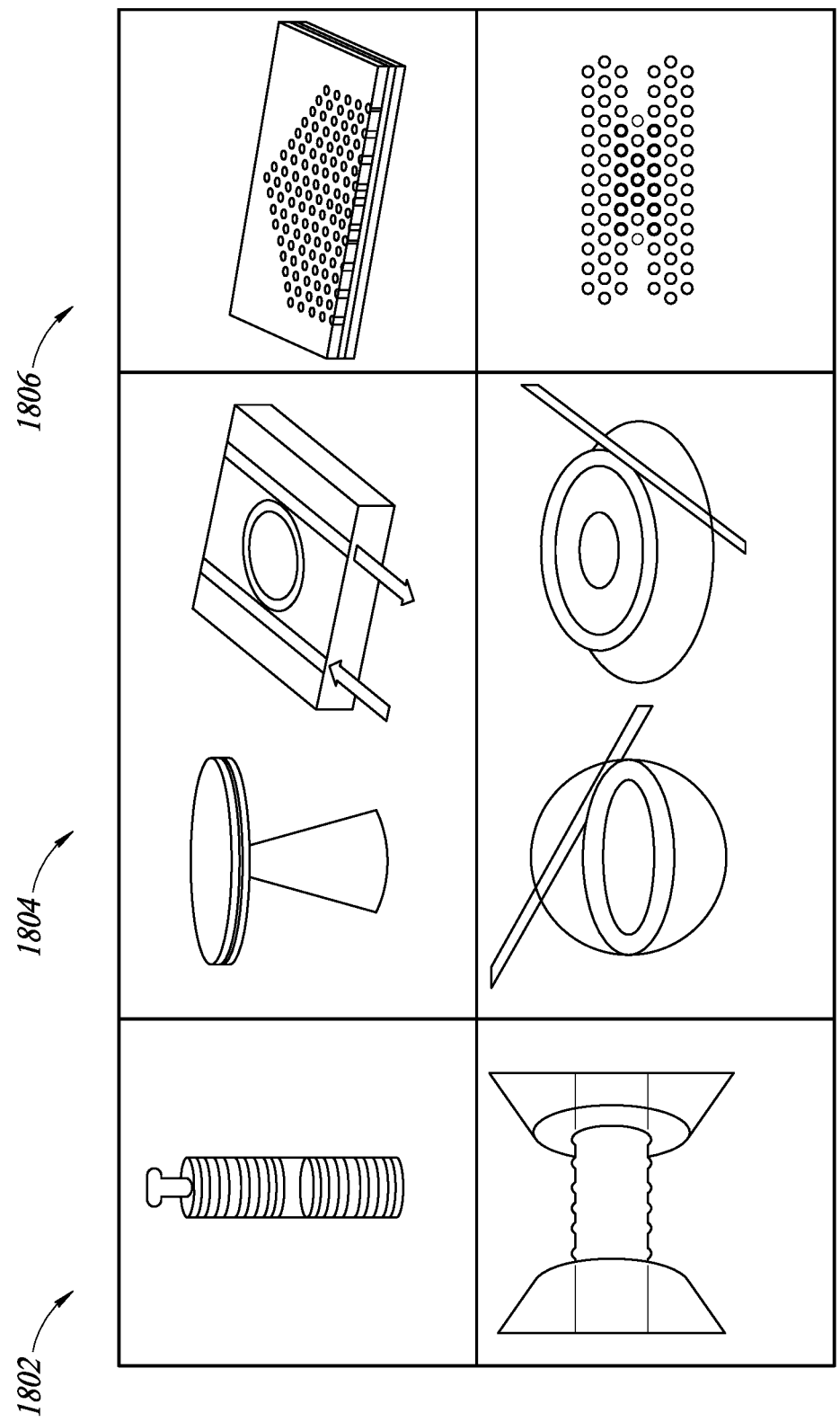
FIG. 18 illustrates examples of optical resonators that may be implemented in a photonic device of a measurement system described herein.

FIG. 18 shows a plurality of optical resonators that may be implemented in a photonic device of a measurement system described herein. The optical resonators include Fabry-Perot interferometers 1802 in which multiple offset beams reflected from surfaces thereof generate resonated light. The optical resonators shown also include whispering gallery resonators 1804 that resonates light in the form of whispering gallery modes. The optical resonators shown also include photonic crystals 1806 that have periodic dielectric structures configured propagate light in certain frequency ranges and inhibit propagation of light of other frequency ranges. These optical resonators are provided as example of the myriad types of optical resonators that may be implemented in the measurement systems described herein. In some embodiments, an optical resonator may have two or more resonant modes, for example, a first resonant mode at a first frequency and a second resonant mode at a second frequency. In such embodiments, the photonic thermometers described herein may include only a single optical resonator having resonant modes for two or more corresponding frequencies. A 2D photonics crystal, for example, may also provide for reflection of the resonated light such that a single optical port and single waveguide may provide both an input optical path and output optical path for the input and output light, respectively.

Figure 19:
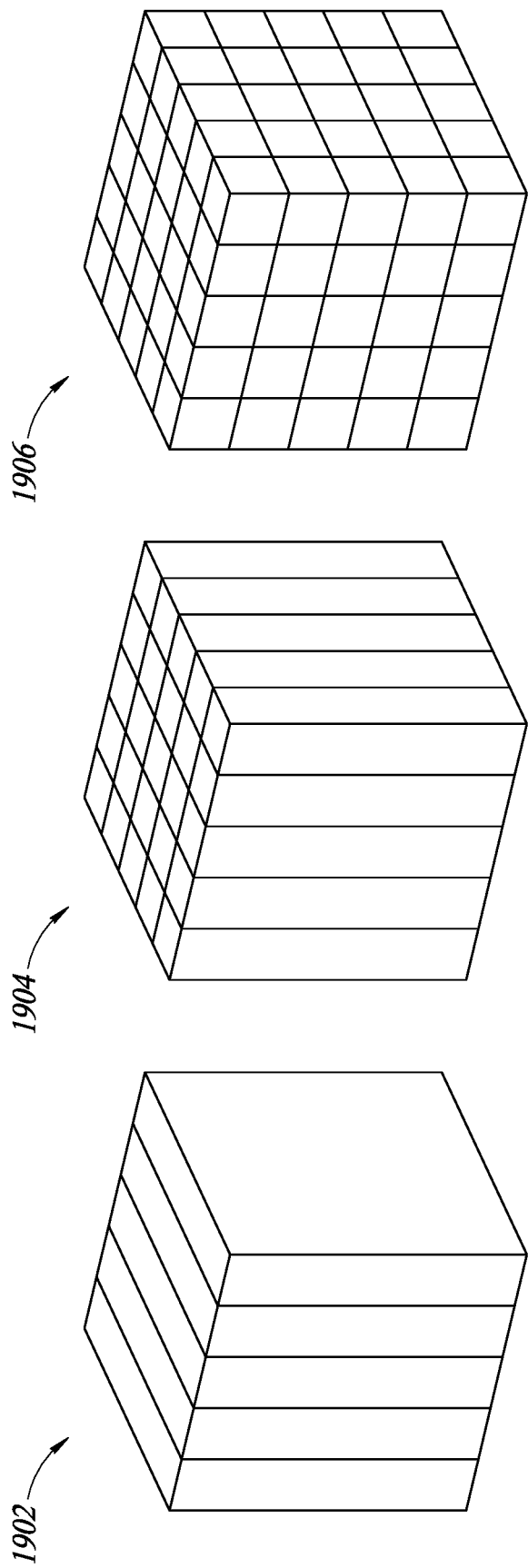
FIG. 19 illustrates exemplary structures of a plurality of photonic crystals that may be used to resonate light in a measurement system as described herein.

FIG. 19 shows exemplary structures of a plurality of photonic crystals that may be used to resonate light in a measurement system as described herein. A first type of photonic crystal 1902 has a crystalline structure that is periodic in one direction. For example, the first type of photonic crystal 1902 has a crystalline atomic arrangement that is periodic (e.g., repeats) along a first direction. A second type of photonic crystal 1904 has a crystalline structure that is periodic in two directions (e.g., two directions orthogonal to each other). A third type of photonic crystal 1906 has a crystalline structure that is periodic in three directions orthogonal to each other. One or more of these types of photonic crystals may be implemented in the embodiments described herein.

Various different types of optical resonators may be implemented in the photonic devices described herein. Non-limiting examples of optical resonators that may be implemented in the photonic devices described herein (e.g., photonic device 302) include whispering gallery mode resonators, photonic crystal cavities, ring resonators, Bragg gratings, Fabry-Perot interferometers (e.g., etalons), and disk resonators. A single optical resonator may include a combination of one or more types of optical resonators. Pairs of optical resonators having different resonant frequency responses (e.g., the first optical resonator 306 and the second optical resonator 312) may include a first optical resonator of a first type and a second optical resonator of a second type. In some embodiments, a single optical resonator may be used instead of two separate optical resonators. In such embodiments, the single optical resonator may have two or more optical modes (either transverse or longitudinal) that provide the different resonant frequency response.

These variations include optical resonator design variation, waveguide dimensions, waveguide paths, different couplers in the light path (e.g. directional coupler, multi-mode interference coupler), different types of coupling to optical resonators (e.g. in-line, adiabatic), or any type of input or output to the chip (e.g. grating coupler, edge coupling, looped fiber coupling, tapered fiber).

The description above, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks and the environment, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

In addition, throughout the specification, claims, and drawings, the following terms take the meaning explicitly associated herein, unless the context clearly dictates otherwise. The term "herein" refers to the specification, claims, and drawings associated with the current document. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or", and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references. References to the term "set" (e.g., "a set of items"), as used herein, unless otherwise noted or contradicted by context, is to be construed as a nonempty collection comprising one or more members or instances.

Thus, in view of the foregoing disclosure, various examples of a photonic device may include any one or combination of the following features: a substrate; a substrate having one or more ports; multiple optical resonators; a first optical resonator in or on the substrate; a first optical resonator having a first resonant frequency; a first optical resonator having a first resonant frequency response relative to temperature; multiple waveguides; a first waveguide that is optically coupled to the one or more ports; a first waveguide that is optically coupled to the first optical resonator; a second optical resonator in or on the substrate; a second optical resonator having a second resonant frequency; a second optical resonator having a second resonant frequency response relative to temperature; the second resonant frequency response of the second optical resonator being different than the first resonant frequency response of the first optical resonator; a second waveguide that is optically coupled to the one or more ports; and a second waveguide that is optically coupled to the second optical resonator.

In one or more examples, the first optical resonator has a size that is different than a size of the second optical resonator, the difference in size influencing the difference between the first resonant frequency response and the second resonant frequency response.

In one or more examples, the first optical resonator has a structural feature that is absent from the second optical resonator, the structural feature influencing the difference between the first resonant frequency response and the second resonant frequency response. In some cases, the structural feature is an additional section.

In one or more examples, the first optical resonator has a structural feature that is different than a structural feature of the second optical resonator, the structural feature influencing the difference between the first resonant frequency response and the second resonant frequency response.

In one or more examples, the first optical resonator includes a material composition that is different than a material composition of the second optical resonator, the difference in material composition influencing the difference between the first resonant frequency response and the second resonant frequency response.

In one or more examples, the first optical resonator is spaced apart from the first waveguide, the second optical resonator is spaced apart from the second waveguide, and the first optical resonator is spaced apart from the second optical resonator.

In one or more examples, the first optical resonator and the second optical resonator are ring resonators.

In one or more examples, a region adjacent to the first optical resonator includes a material composition that is different than a material composition adjacent to a corresponding region adjacent to the second optical resonator, the difference in material composition influencing the difference between the first resonant frequency response and the second resonant frequency response.

In one or more examples, a first mechanical stress applied to the first optical resonator is different than a second mechanical stress applied to the second optical resonator, the difference in mechanical stress influencing the difference between the first resonant frequency response and the second resonant frequency response.

In one or more examples, the first optical resonator is optically decoupled from the second optical resonator.

In one or more examples, the first waveguide includes a first port and the second waveguide includes a second port, the first waveguide being optically decoupled from the second waveguide.

In one or more examples, the photonic device may further comprise a third waveguide including a third port, the third waveguide being optically decoupled from the first waveguide and the second waveguide, wherein the third waveguide is optically coupled to at least one of the first optical resonator and the second optical resonator.

In one or more examples, the first waveguide includes a third port and the second waveguide includes a fourth port.

In one or more examples, the photonic device may further comprise a third waveguide optically coupled to the first optical resonator, the third waveguide including a third port and being optically decoupled from the first waveguide, and a fourth waveguide optically coupled to the second optical resonator, the fourth waveguide including a fourth port and being optically decoupled from the second waveguide.

In one or more examples, the first waveguide is optically coupled to the second optical resonator and the second waveguide is optically coupled to the first optical resonator.

In one or more examples, the photonic device may further comprise a third optical resonator in or on the substrate and having a third resonant frequency response relative to temperature, the third resonant frequency response being different than the first resonant frequency response and the second resonant frequency response. The third optical resonator may be optically coupled to the first waveguide and the second waveguide. A third waveguide may be optically coupled to the third optical resonator, and the third waveguide may include a third port.

In one or more examples, the photonic device may further comprise a fourth optical resonator in or on the substrate and having a fourth resonant frequency response relative to temperature, the fourth resonant frequency response being different than the first resonant frequency response, the second resonant frequency response, and the third resonant frequency response.

In one or more examples, the photonic device may further comprise a third waveguide optically coupled to the third optical resonator, the third waveguide including a third port, and a fourth waveguide optically coupled to the fourth optical resonator, the fourth waveguide including a fourth port.

In one or more examples, the photonic device may further comprise one or more optical switches selectively controllable to optically couple the first waveguide to the second optical resonator.

In one or more examples, the photonic device may further comprise a waveguide junction between the first waveguide and the second waveguide, and a third waveguide optically coupled between the waveguide junction and a port of the one or more ports.

In one or more examples, the photonic device may further comprise a first waveguide loop optically coupled to an end of the first waveguide, and a second waveguide loop optically coupled to an end of the second waveguide.

In one or more examples, the first waveguide includes a first optically reflective end portion and the second waveguide includes a second optically reflective end portion.

In one or more examples, the first optical resonator is a first type of optical resonator and the second optical resonator is a second type of optical resonator different than the first type of optical resonator.

In one or more examples, the photonic device may further comprise one or more light sources configured to generate input light that is directed into the first waveguide or the second waveguide. The one or more light sources may include a first light source configured to emit a first light beam, the first light source being controllable to adjust a frequency of the first light beam.

In one or more examples, the photonic device may further comprise an optical beam splitter configured to split the first light beam to form a second light beam, and an optical shifter configured to receive the second light beam and adjust a frequency of the second light beam, wherein the first light beam is directed into the first waveguide and the second light beam is directed into the second waveguide.

In one or more examples, the one or more light sources include a second light source configured to emit a second light beam, the second light source being controllable to adjust a frequency of the second light beam. The first light source may a first laser light source, and the second light source may be a second laser light source. In one or more examples, the first and second laser light sources are separately controllable to adjust the frequency of the first and second light beams respectively.

In view of the foregoing disclosure, various examples of a method of operating a measurement system including a photonic device may include any one or combination of the following features: directing a first light beam into a first waveguide of the photonic device; directing a second light beam into a second waveguide of the photonic device; combining first output light received from the first waveguide and second output light received from the second waveguide into combined light; determining a frequency difference between the first output light and the second output light based on the combined light; and where the measurement system is a temperature measurement system, determining a temperature of the photonic device based on the frequency difference.

In one or more examples, the method may further comprise locking a frequency of the first light beam to a first resonant frequency of a first optical resonator in the photonic device, and locking a frequency of the second light beam to a second resonant frequency of a second optical resonator in the photonic device. The frequency difference is determined subsequent to the frequency of the first light beam being locked to the first resonant frequency and the frequency of the second light beam being locked to the second resonant frequency.

In one or more examples, the method may further comprise splitting a light beam into the first light beam and the second light beam, and shifting an optical characteristic of the second light beam relative to the first light beam prior to directing the second light beam into the second wave guide. The optical characteristic may be a frequency of the second light beam that is shifted relative to a frequency of the first light beam.

In one or more examples, the method may further comprise converting the combined light into an electric signal, and detecting a beat frequency of the combined light based on the electric signal.

In one or more examples, the method may further comprise accessing temperature correspondence data stored in memory, and determining the temperature of the photonic device based on a correspondence between the frequency difference and the temperature in the temperature correspondence data.

In one or more examples, the method may further comprise controlling a first light source to adjust a frequency of the first light beam from a first frequency to a second frequency, the second frequency corresponding to a first resonant frequency of a first optical resonator that is optically coupled to the first waveguide.

In one or more examples, the method may further comprise controlling an optical frequency shifter to adjust a frequency of the second light beam to a third frequency, the third frequency corresponding to a second resonant frequency of a second optical resonator that is optically coupled to the second waveguide.

In one or more examples, the method may further comprise controlling a second light source to adjust a frequency of the second light beam to a third frequency, the third frequency corresponding to a second resonant frequency of a second optical resonator that is optically coupled to the second waveguide. The methods described herein may thus relate to a method of detecting temperature, a method of detecting temperature with a photonic device, a method of operating a measurement system, a method of operating a temperature measurement system, and a method of operating a measurement system including a photonic device.

In view of the disclosure herein, various examples of a photonic system may include any one or combination of the following features: a photonic device; a photonic device including a substrate; a plurality of optical resonators; a first optical resonator in or on the substrate; a first optical resonator having a first resonant frequency response; a first optical resonator having a first resonant frequency response relative to temperature; a second optical resonator in or on the substrate; a second optical resonator having a second resonant frequency response; a second optical resonator having a second resonant frequency response relative to temperature; a first waveguide optically coupled to receive a first light beam; a first waveguide optically coupled to the first optical resonator; a second waveguide optically coupled to receive a second light beam; a second waveguide optically coupled to the second optical resonator; an optical combiner configured to combine first output light from the first waveguide and second output light from the second waveguide into combined light; and a photodetector configured to convert the combined light from the optical combiner into an electric signal.

In one or more examples, the photonic system may further comprise one or more measurement devices configured to measure a characteristic of the electric signal. The characteristic of the electric signal may be indicative of a temperature of the photonic device.

In one or more examples, the one or more measurement devices includes a frequency counter configured to measure a frequency of the electric signal.

In one or more examples, the one or more measurement devices includes a spectrum analyzer configured to analyze an energy distribution in a frequency spectrum of the electric signal and measure a magnitude of the energy distribution in the frequency spectrum relative to a frequency in the frequency spectrum.

In one or more examples, the photonic system may further comprise an optical shifter configured to receive the second light beam and shift an optical characteristic of the second light beam prior to the second waveguide receiving the second light beam. The optical characteristic may be a frequency of the second light beam.

In one or more examples, the photonic system may further comprise an optical frequency locked loop configured to control a frequency of the second light beam relative to a frequency of the first light beam.

In one or more examples, the photonic system may further comprise an optical beam splitter configured to split light emitted by a light source into the first light beam and the second light beam.

In one or more examples, the photonic system may further comprise a first light source configured to emit the first light beam. The first light source may be controllable to adjust a frequency of the first light beam. In one or more examples, the photonic system may further comprise a second light source configured to emit the second light beam. The second light source may be controllable to adjust a frequency of the second light beam.

In one or more examples, the first light source and the second light source are separately-controllable first and second laser light sources.

In one or more examples, the photonic system may comprise a broadband light source configured to emit broadband light having a frequency spectrum between a first frequency and a second frequency. The broadband light source may provide the first light beam and/or the second light beam.

In view of the disclosure herein, additional examples of a photonic device may include any one or combination of the following features: a multimode optical resonator; a first waveguide optically coupled to receive input light; a first waveguide optically coupled to the multimode optical resonator; the multimode optical resonator configured to resonate light having a first frequency and resonate light having a second frequency; and a measurement device configured to determine a temperature of the photonic device based on a beat frequency of light that is output from the first waveguide.

In one or more examples, the multimode optical resonator is a bi-modal optical ring resonator having a first portion that resonates light having the first frequency and a second portion that resonates light having the second frequency.

In one or more examples, the photonic device may further comprise a first waveguide loop optically coupling the first waveguide to the multimode optical resonator.

In one or more examples, the photonic device may further comprise a second waveguide optically coupled to receive input light, and a second waveguide loop optically coupling the second waveguide to the multimode optical resonator.

In one or more examples, a first portion of the multimode optical resonator has a different material composition than a second portion of the multimode optical resonator.

In one or more examples, a first portion of the multimode optical resonator has a different size than a second portion of the multimode optical resonator.

In one or more examples, a first portion of the multimode optical resonator has a different shape than a second portion of the multimode optical resonator.

In one or more examples, a first portion of the multimode optical resonator has a different mechanical stress imposed thereon than a second portion of the multimode optical resonator.

In one or more examples, the multimode optical resonator is a photonic crystal having a crystalline structure that is periodic in two or more directions.

In one or more examples, the photonic device may further comprise a first light source configured to emit light that is received by the first waveguide as the input light.

In one or more examples, the first light source is a broadband light source configured to emit broadband light having a spectrum between a first frequency and a second frequency.

In one or more examples, the first light source is configured to emit light at a first frequency locked to a first resonant frequency of the multimode resonator. The photonic device may further comprise a second light source configured to emit light at a second frequency locked to a second resonant frequency of the same multimode resonator.

In one or more examples, the photonic device may further comprise one or more photodetectors configured to convert the light that is output from the first waveguide into an electric signal, wherein the measurement device is configured to determine the beat frequency of the light based on a detected frequency in the electric signal.

In view of the foregoing disclosure, various examples of a method of operating a photonic device may include any one or combination of the following features: directing broadband light into a photonic device having a resonant frequency; generating output light by the photonic device; converting the output light into an electric signal; determining a beat frequency of the output light based on the electric signal; and determining a temperature of the photonic device based on the determined beat frequency.

In one or more examples, the photonic device has multiple resonant frequencies including at least a first resonant frequency corresponding to a first frequency of light in the broadband light and a second resonant frequency corresponding to a second frequency of light in the broadband light, wherein the method includes generating the output light includes combining light of at least the first and second frequencies that has traversed the photonic device.

The various embodiments and examples described above can be combined to provide further embodiments and examples. These and other changes can be made to the embodiments and examples in light of the above-detailed description. In general, in the following claims, the terms used should not be construed to limit the claims to the specific embodiments or examples disclosed in the specification, but should be construed to include all possible embodiments along with the full scope of equivalents to which such claims are entitled. Accordingly, the claims are not limited by the disclosure.

The invention claimed is:

1. A photonic system, comprising:
    a photonic device including:
        a substrate;
        a first optical resonator in or on the substrate and having a first resonant frequency response relative to temperature;
        a second optical resonator in or on the substrate and having a second resonant frequency response relative to temperature;
        a first waveguide optically coupled to the first optical resonator, wherein the first waveguide is configured to receive a first light beam;
        an optical shifter configured to receive a second light beam and shift a frequency of the second light beam to produce a frequency-shifted second light beam; and
        a second waveguide optically coupled to the second optical resonator, wherein the second waveguide is configured to receive the frequency-shifted second light beam; and
    a detector configured to convert output light from the photonic device into an electric signal, the electric signal having a characteristic that is indicative of a physical condition of the photonic device.

2. The photonic system according to claim 1, further comprising:
    an optical combiner configured to combine first output light from the first waveguide and second output light from the second waveguide into combined light, the combined light being the output light of the photonic device; and
    one or more measurement devices configured to measure the characteristic of the electric signal, wherein the characteristic of the electric signal is indicative of a temperature of the photonic device.

3. The photonic system according to claim 2, wherein the characteristic of the electric signal is a frequency of the electric signal, and the one or more measurement devices includes a frequency counter configured to measure the frequency of the electric signal.

4. The photonic system according to claim 2, wherein the characteristic of the electric signal is an energy distribution in a frequency spectrum of the electric signal, and the one or more measurement devices includes a spectrum analyzer configured to analyze the energy distribution and measure a magnitude of the energy distribution in the frequency spectrum relative to a frequency in the frequency spectrum.

5. The photonic system according to claim 1, further comprising:
    an optical frequency locked loop configured to control the frequency of the second light beam relative to a frequency of the first light beam.

6. The photonic system according to claim 1, further comprising:
    an optical beam splitter configured to split light emitted by a light source into the first light beam and the second light beam.

7. The photonic system according to claim 1, further comprising:
    a first light source configured to emit the first light beam, wherein the first light source is controllable to adjust a frequency of the first light beam; and
    a second light source configured to emit the second light beam, wherein the second light source is controllable to adjust the frequency of the second light beam.

8. The photonic system according to claim 7, wherein the first light source and the second light source are first and second laser light sources that are separately controllable to adjust the frequency of the first light beam and the second light beam, respectively.

9. The photonic system according to claim 1, further comprising a broadband light source configured to emit the first light beam having a frequency spectrum between a first frequency and a second frequency.

10. A method of operating a measurement system, comprising:
- directing a first light beam into a first waveguide of a photonic device and optically coupling the first light beam from the first waveguide to a first optical resonator;
- shifting a frequency of a second light beam to produce a frequency-shifted second light beam;
- directing the frequency-shifted second light beam into a second waveguide of the photonic device and optically coupling the frequency-shifted second light beam from the second waveguide to a second optical resonator;
- determining a frequency difference between first output light from the first waveguide and second output light from the second waveguide; and
- based on the frequency difference, determining a temperature of the photonic device.

11. The method of operating a measurement system according to claim 10, further comprising:
- controlling a first light source to adjust a frequency of the first light beam to a first resonant frequency of the first optical resonator that is optically coupled to the first waveguide.

12. The method of operating a measurement system according to claim 11, further comprising:
- controlling an optical frequency shifter to shift the frequency of the second light beam to a second resonant frequency of the second optical resonator that is optically coupled to the second waveguide.

13. The method of operating a measurement system according to claim 11, further comprising:
- controlling a second light source to shift the frequency of the second light beam to a second resonant frequency of the second optical resonator that is optically coupled to the second waveguide.

14. The method of operating a measurement system according to claim 10, further comprising:
- locking a frequency of the first light beam to a first resonant frequency of the first optical resonator in the photonic device; and
- locking a frequency of the second light beam to a second resonant frequency of the second optical resonator in the photonic device,
- wherein the frequency difference is determined subsequent to locking the frequency of the first light beam to the first resonant frequency and locking the frequency of the second light beam to the second resonant frequency.

15. The method of operating a measurement system according to claim 10, further comprising:
- splitting a light beam into the first light beam and the second light beam.

16. The method of operating a measurement system according to claim 10, wherein the frequency of the second light beam is shifted relative to a frequency of the first light beam.

17. The method of operating a measurement system according to claim 10, further comprising:
- combining the first output light from the first waveguide and the second output light from the second waveguide into combined light;
- converting the combined light into an electric signal;
- detecting a beat frequency of the combined light based on the electric signal, wherein the beat frequency is indicative of the frequency difference between the first output light and the second output light; and
- based on the beat frequency, determining the temperature of the photonic device.

18. The method of operating a measurement system according to claim 10, further comprising:
- accessing temperature correspondence data stored in memory; and
- determining the temperature of the photonic device based on a correspondence between the frequency difference and the temperature in the temperature correspondence data.

* * * * *